(12) United States Patent
Zou

(10) Patent No.: US 8,824,504 B2
(45) Date of Patent: Sep. 2, 2014

(54) PACKET ADD/DROP MULTIPLEXER AND DATA TRANSMISSION METHOD OF PACKET ADD/DROP MULTIPLEXER

(75) Inventor: Shimin Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 796 days.

(21) Appl. No.: 13/030,712

(22) Filed: Feb. 18, 2011

(65) Prior Publication Data

US 2011/0142448 A1    Jun. 16, 2011

Related U.S. Application Data

(63) Continuation of application No. PCT/CN2009/072040, filed on May 27, 2009.

(30) Foreign Application Priority Data

Aug. 20, 2008    (CN) .......................... 2008 1 0118631

(51) Int. Cl.
  *H04J 3/24*       (2006.01)
  *H04J 14/02*      (2006.01)

(52) U.S. Cl.
  CPC ......... *H04J 14/0201* (2013.01); *H04J 14/0283* (2013.01)
  USPC ...................................... 370/474; 370/395.51

(58) Field of Classification Search
  CPC .. H04Q 11/0067; H04J 14/00; H04J 14/0201; H04J 14/0283
  See application file for complete search history.

(56) References Cited

U.S. PATENT DOCUMENTS 7,382,789 B2    6/2008   Yu
8,107,362 B2 *  1/2012   Clauberg ...................... 370/222
(Continued)

FOREIGN PATENT DOCUMENTS

CN    1728720 A    2/2006
CN    1780193 A    5/2006
(Continued)

OTHER PUBLICATIONS

Written Opinion of the International Searching Authority (translation) dated (mailed) Sep. 10, 2009, issued in related Application No. PCT/CN2009/072040, filed May 27, 2009, Huawei Technologies Co., Ltd.

(Continued)

Primary Examiner — Phirin Sam
(74) Attorney, Agent, or Firm — Leydig, Voit & Mayer, Ltd.

(57) ABSTRACT

A packet add/drop multiplexer and a data transmission method of a packet add/drop multiplexer are provided. The packet add/drop multiplexer includes: a line interface unit including a first line interface and a second line interface; a scheduling unit, configured to schedule a data frame of an input transporting side and send a data frame of an output transporting side through the second line interface; a branch unit, configured to encapsulate received data to a third Transmission Container (T-CONT) data packet and send the third T-CONT data packet to the scheduling unit, or decapsulate a first T-CONT data packet sent by the scheduling unit to recover data. In the packet add/drop multiplexer and the data transmission method of the packet add/drop multiplexer, a T-CONT data packet of a transporting side is used as a packet add/drop multiplexing structure of a packet scheduling entity, the data packet has a simple structure and a capability of self-synchronization, and the logic is simple when the data packet is processed.

21 Claims, 16 Drawing Sheets

(56) References Cited

U.S. PATENT DOCUMENTS

| | | | |
|---|---|---|---|
| 8,520,685 B2* | 8/2013 | Nagata et al. | 370/395.51 |
| 8,634,431 B1* | 1/2014 | Chiang et al. | 370/412 |
| 2006/0233197 A1* | 10/2006 | Elmoalem et al. | 370/468 |
| 2007/0058572 A1 | 3/2007 | Clauberg | |
| 2007/0230495 A1* | 10/2007 | Li | 370/412 |
| 2008/0124081 A1* | 5/2008 | Hamada et al. | 398/59 |
| 2008/0205443 A1* | 8/2008 | Shi et al. | 370/468 |
| 2008/0279554 A1* | 11/2008 | Kazawa et al. | 398/69 |
| 2009/0034973 A1* | 2/2009 | Sakamoto et al. | 398/58 |
| 2009/0232004 A1* | 9/2009 | Suzuki et al. | 370/241 |
| 2010/0008379 A1* | 1/2010 | Yoo et al. | 370/468 |
| 2011/0249972 A1* | 10/2011 | Nemoto et al. | 398/66 |
| 2012/0307830 A1* | 12/2012 | DelRegno et al. | 370/400 |

FOREIGN PATENT DOCUMENTS

| | | |
|---|---|---|
| KR | 20040056383 | 7/2004 |
| WO | WO2010020130 A1 | 2/2010 |

OTHER PUBLICATIONS

First Chinese Office Action dated (mailed Nov. 24, 2011, issued in related Chinese Application No. 200810118631.8 Huawei Technologies C., Ltd (7 pages).

Davik, F., et al.; IEEE 802.17 Resilient Packet Ring Tutorial; Ethernet Transport Over Wide Area Networks; IEEE Communications Magazine, Mar. 2004, (pp. 112-118).

European Patent Office communication, pursuant to Rule 62 EPC, the supplemental European search report (Art. 153(7) EPC) and the European search opinion relating to European Application No. 09807829.8 (PCT/CN2009072040) (5 pgs.).

Liu,X., et al., IEEE 802.17 Resilient Burst Ring: Extend IEEE 802.17 to WDM Networks, IEEE Communications Magazine, Nov. 2008, (pp. 74-81).

IEEE Recommended Practices for Broadband Local Area Networks, IEEE Std 802.7-1989, Oct. 1989.

International Search Report for International Application No. PCT/CN2009/072040, mailed Sep. 10, 2009 Huawei Technologies Co., Ltd.

* cited by examiner

| | IDLE | | | |
|---|---|---|---|---|
| Overhead area | T-CONT data packet 1 | | | |
| | | IDLE | | |

FIG. 16

PACKET ADD/DROP MULTIPLEXER AND DATA TRANSMISSION METHOD OF PACKET ADD/DROP MULTIPLEXER

CROSS-REFERENCE TO RELATED APPLICATIONS

This application is a continuation of International Application No. PCT/CN2009/072040, filed on May 27, 2009, which claims priority to Chinese Patent Application No. 200810118631.8, filed on Aug. 20, 2008, both of which are hereby incorporated by reference in their entireties.

FIELD OF THE TECHNOLOGY

The present invention relates to the field of mobile communications technology, and more particularly to a packet add/drop multiplexer, and a data transmission method of a packet add/drop multiplexer.

BACKGROUND OF THE INVENTION

The concept of an ADD/DROP Multiplexer (ADM) is implemented by a Synchronous Digital Hierarchy/Synchronous Optical Network (SDH/SONET) technology, and implements ADD and DROP functions of a data service based on a cross-connect matrix of a Time Division Multiplex (TDM) circuit. With the development of the data service, the SDH is developed to a Multi-Service Transport Platform (MSTP) based on the SDH, the data service is adapted to a Virtual Channel (VC) through an adaptation protocol (such as GFP) for being transmitted, but the cross-connect matrix of the MSTP is still implemented based on the TDM technology, and the scheduling of data service is realized by scheduling the matrix using the TDM. However, as the era of all-IP comes, nearly all the data services may be encapsulated and borne by the IP, the data services based on the TDM are gradually reduced. Voice, broadband data, video, and other data services exist in a form of data packets, and each data packet is an independent entity. Therefore, it is outdated to process the ADD and DROP functions of the data service based on the data packet by scheduling the cross-connect matrix of the MSTP that uses the TDM technology based on hard pipes.

As an existing developed technology relevant to the MSTP, a Resilient Packet Ring (RPR) technology is a new type media access control (MAC) layer protocol optimizing the data service transporting on a ring structure, and the detailed description may be obtained with reference to IEEE 802.17. The RPR may be adaptable to various physical layers (for example, SDH, Ethernet, and dense wavelength division multiplexing), and may effectively various service types, such as transport data, voice, and image. The RPR has the economical efficiency, the flexibility, the expandability, and other features of the Ethernet technology, and has a 50 ms fast protection advantage of the SDH ring network. In addition, the RPR has technical advantages such as network topology automatic finding, loop bandwidth sharing, fair assigning, and strict service classifying. The RPR aims to provide a more economical and effective metropolitan area network solution without lowering the network performance and the reliability.

However, the RPR technology has limitations on application, and is a connectionless technology, so the RPR technology cannot completely ensure the Quality of Service (QoS). A distributed fair control algorithm is adopted on Dynamic Bandwidth Assignment (DBA). In the algorithm, each node needs to know all network technologies and process all the algorithms, which is much complicated in implementation.

SUMMARY OF THE INVENTION

The embodiments of the present invention provide a packet add/drop multiplexer, and a data transmission method of a packet add/drop multiplexer, so that a network transporting side may perform add/drop multiplexing on data in a form of a data packet, thereby implementing a transmission network that is based on the packet add/drop multiplexing and has connections and a high QoS capability.

In an embodiment, the present invention provides a packet add/drop multiplexer. The device includes a line interface unit, a scheduling unit, and at least one branch unit.

The line interface unit includes a first line interface, configured to receive a data frame of an input transporting side; and a second line interface, configured to send a data frame of an output transporting side.

The scheduling unit is configured to drop the received data frame of the input transporting side, send a first Transmission Container (T-CONT) data packet in the data frame of the input transporting side to a branch unit, in which a destination Network Element (NE) identifier (ID) of the first T-CONT data packet is a local NE ID; buffer a second T-CONT data packet in the data frame of the input transporting side, and perform a rate adjustment on the buffered second T-CONT data packet, in which a destination NE ID of the second T-CONT data packet is a non-local NE ID.

The at least one branch unit is configured to decapsulate the received first T-CONT data packet, extract a Gigabit-Capable Passive Optical Network (GPON) Encapsulation Method (GEM) data packet in the first T-CONT data packet, assemble the GEM data packet in a downstream data frame of the branch unit, and send the downstream data frame to a terminal; or extract a GEM data packet in an upstream data frame of the branch unit, encapsulate the GEM data packet in a third T-CONT data packet, and send the third T-CONT data packet;

The scheduling unit is further configured to perform frame reassembly on the second T-CONT data packet after the rate adjustment and the third T-CONT data packet sent by the branch unit, generate the data frame of the output transporting side, and send the data frame of the output transporting side to the second line interface, in which a source NE ID of the third T-CONT data packet is a local NE ID.

In another embodiment, the present invention further provides a data transmission method of a packet add/drop multiplexer. The method includes the following steps:

A received data frame of an input transporting side is dropped, a first T-CONT data packet in the data frame of the input transporting side is sent to a branch unit, in which a destination NE ID of the first T-CONT data packet is a local NE ID; a second T-CONT data packet in the data frame of the input transporting side is buffered, and a rate adjustment is performed on the buffered second T-CONT data packet, in which a destination NE ID of the second T-CONT data packet is a non-local NE ID.

The first T-CONT data packet received by the branch unit is decapsulated, a GEM data packet in the first T-CONT data packet is extracted, the GEM data packet is assembled in a downstream data frame of the branch unit, and the downstream data frame is sent to a terminal.

A GEM data packet in an upstream data frame of the branch unit is extracted, the GEM data packet is encapsulated in a third T-CONT data packet, and the third T-CONT data packet is sent.

Frame reassembly is performed on the second T-CONT data packet after the rate adjustment and the third T-CONT data packet sent by the branch unit, a data frame of an output transporting side is generated, and the data frame of the output transporting side is sent, in which a source NE ID of the third T-CONT data packet is a local NE ID.

It may be known from the technical solutions that in the packet add/drop multiplexer and the data transmission method of the packet add/drop multiplexer according to the present invention, the T-CONT data packet of the transporting side is used as a packet add/drop multiplexing structure of a packet scheduling entity, and transporting side DBA is adopted to dynamically establish bandwidth connections according to a transporting side bandwidth request, so that a packet add/drop multiplexing architecture having connections is realized. The T-CONT data packet has a simple structure and a self-synchronization capability, and may utilize existing GEM packet synchronous algorithm and logic, so that the logic is simple when the T-CONT data packet is processed, and meanwhile, the T-CONT data packet is used as an end-to-end transporting channel layer, thus having a capability to monitor performance.

The present invention is further described in detail with reference to specific embodiments and accompanying drawings in the following.

BRIEF DESCRIPTION OF THE DRAWINGS

FIG. 16 is a schematic diagram of a frame structure of a T-CONT data flow of a transporting side assigned according to sub-frames according to an embodiment of the present invention.

DETAILED DESCRIPTION OF THE EMBODIMENTS

The present invention provides a packet add/drop multiplexer having connections and a high QoS capability, in which an upstream data packet of each branch unit of each NE forms a T-CONT data packet of a transporting side, so that add/drop multiplexing is performed in a form of packet at the transporting side. The present invention further provides a method for intensively processing and implementing DBA of the transporting side in a ring network based on the packet add/drop multiplexer.

A network structure of a ring network, a PON, and a DBA technology applied in the present invention are introduced in the following.

Figure 1:
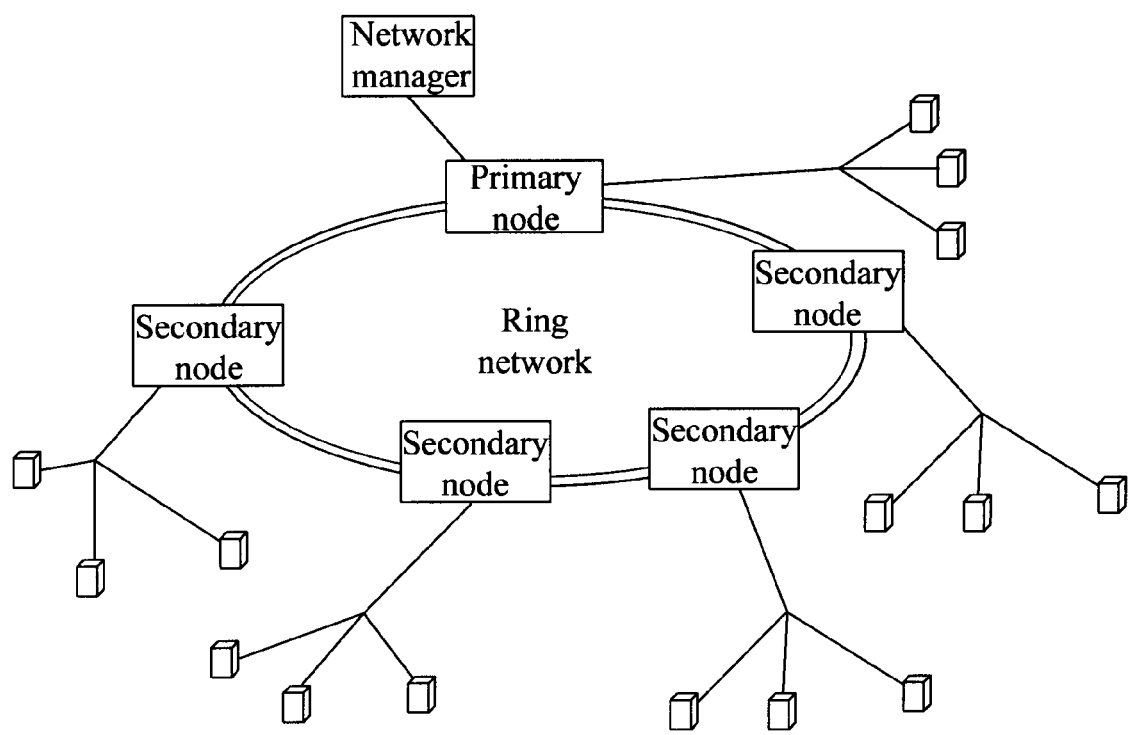
FIG. 1 is a schematic diagram of a network structure of a ring network according to an embodiment of the present invention.

Referring to FIG. 1, it is a schematic diagram of a network structure of a ring network according to an embodiment of the present invention. Referring to FIG. 1, the ring network is formed by a plurality of NEs connected as a ring through line interfaces, and nodes of the NEs on the ring network form a transporting side. Branches of each NE may be differently formed, for example, the branches of each NE may be a plurality of PON branches; or may also be a plurality of common branches, such as, a Fast Ethernet (FE) and a Gigabit Ethernet (GE); or may also be mixed branches including a plurality of PON branches and common branches such as the FE and the GE. Referring to FIG. 1, an NE connected to a network manager may be a primary node NE, a node on the ring network is a primary node, other NEs on the ring network are secondary node NEs, and other nodes on the ring network are secondary nodes. In addition, in the present invention, the plurality of branches of each NE may be set on a card, so that the plurality of branches of one NE may correspondingly have a plurality of different IDs.

In the NE including the PON branches, an Optical Line Terminal (OLT) is used as a node on the ring network. The plurality of branches of each NE may be set on the card, so the OLT may correspondingly have a plurality of Optical Distribution Networks (ODNs), and each ODN includes a plurality of Optical Network Units (ONUs). Here, the plurality of PON branches under one NE may correspondingly have a plurality of different ODN IDs.

The PON branches may include Ethernet PON (EPON) branches and Gigabit-Capable PON (GPON) branches. Taking a GPON branch as an example, a structure of a data frame of the GPON has a period of 125 microseconds, and is defined as a Transmission Convergence (TC) layer, the structure includes a frame synchronization and management overhead area and a payload area. The OLT of the GPON branch sends an overhead indicating an upstream time-slot of each ONU in a downstream data frame, and each ONU sends a burst data packet according to a time-slot position indicated by the downstream overhead.

One important technology of the GPON is a GPON Encapsulation Method (GEM) adaptation protocol, which is altered from a Generic Framing Procedure (GFP). The GEM is different from the GFP in that, the GEM is not only an adaptation protocol but also a link layer protocol having a switching capability, and the GEM is adaptable to encapsulation of the Ethernet and other service data, and is also adaptable to encapsulation of the TDM and other service data, so that the GEM is one of desired solutions of integrated service access.

Figure 2:
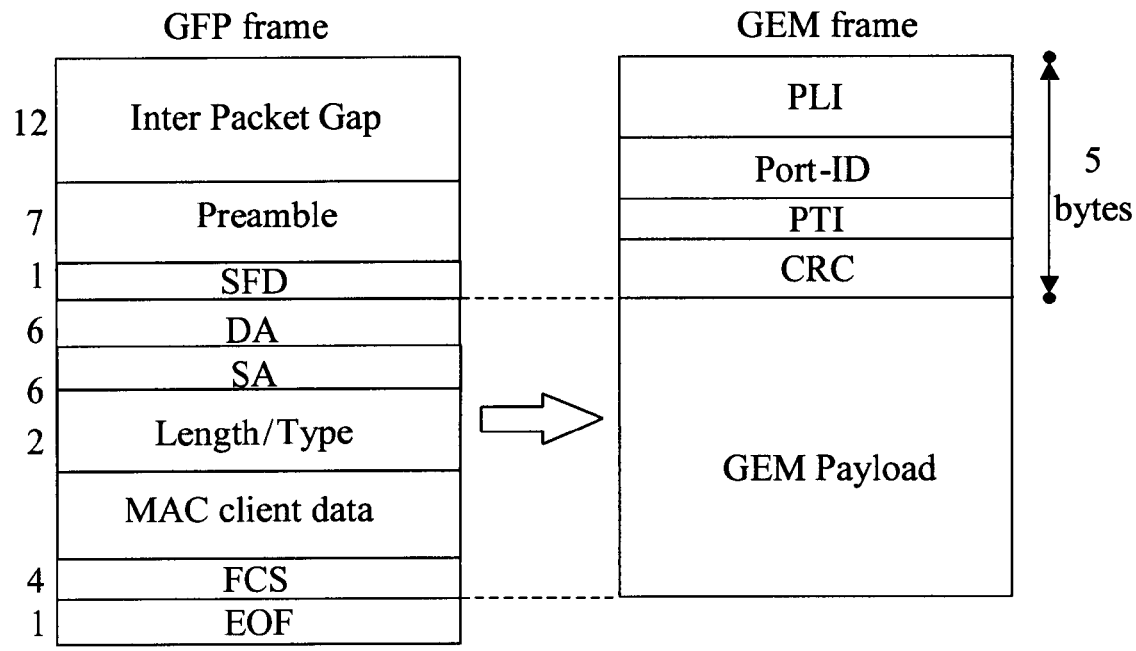
FIG. 2 is a schematic structural view of a GEM frame according to an embodiment of the present invention.

Referring to FIG. 2, it is a schematic structural view of a GEM frame according to an embodiment of the present invention. Differences between the GEM and the GFP lie in that the following: the GFP performs processing by using 8 bits as a byte, a Payload Length Indicator (PLI) of the GFP is 16 bits, but the GEM performs processing not by using 8 bits as a byte, and a PLI is 12 bits; a Head Error Check (HEC) of the GFP is 16 bits, and a Cyclic Redundancy Code (CRC) of the GEM is 12 bits. The GEM and the GFP are different on logic processing, but have similar basic principles. A big difference between the GEM and the GFP is that the GEM has a PORT-ID, and may perform multiplexing or switching according to the PORT-ID, but the GFP does not have a link layer switching capability. In addition, the GEM is applicable between the ONU and the OLT in the GPON, but the GFP is only applicable to the transporting network as an adaptation protocol of a transporting channel.

Figure 3:
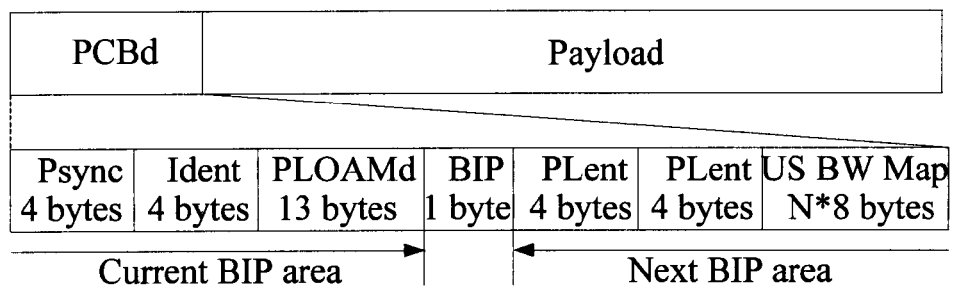
FIG. 3 is a schematic structural view of a GPON downstream data frame according to an embodiment of the present invention.

Referring to FIG. 3, a structure of a GPON downstream data frame according to an embodiment of the present invention is shown. One downstream data frame in the GPON includes a Physical Control Block downstream (PCBd) overhead area and a payload area. The PCBd overhead area includes a Physical Synchronization (PSync) domain, an Ident domain, a Physical Layer OAM downstream (PLOAMd) domain, a Bit Interleaved Parity (BIP) domain, a Payload Length downstream (PLend) domain, and an Upstream Bandwidth Map (US BW Map) domain. The PSync domain is used to implement synchronization between the ONU and the OLT, the PLOAMd domain is used to bear downstream physical layer OAM (PLOAM) information, the BIP domain is used to perform bit error detection, the PLend domain is used to describe a length of the US BW Map domain and an amount of cells in the payload; the US BW Map domain is used to describe the assignment of an upstream bandwidth. The US BW Map domain is used to allocate the upstream bandwidth. The US BW Map domain includes an upstream time-slot indication overhead to indicate a starting position and an ending position of each ONU upstream time-slot. The control object of the bandwidth assignment is a T-CONT, and the OLT may assign one or more T-CONTs for one ONU. The T-CONT is a concept introduced into the PON DBA technology, so that an efficiency of the DBA is improved.

Figure 4A:
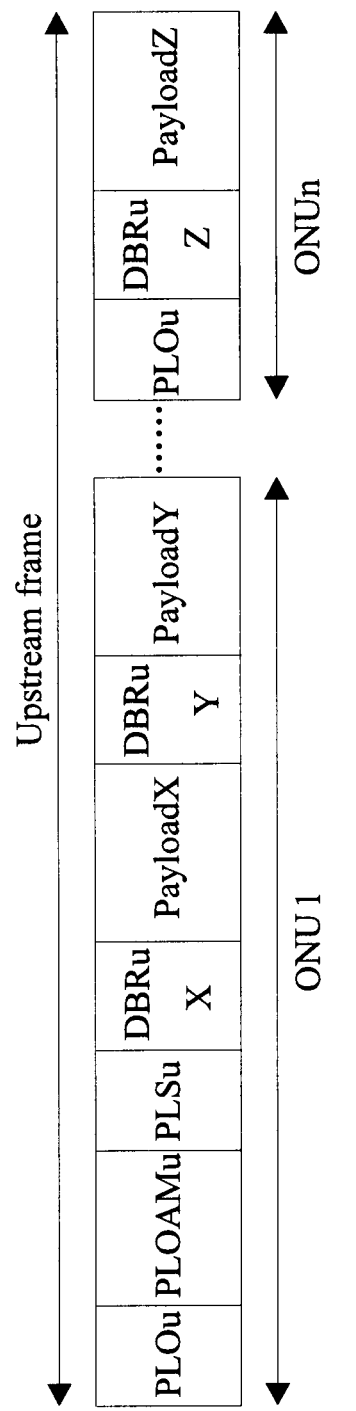
FIG. 4A is a schematic structural view of a GPON upstream data frame according to an embodiment of the present invention.
Figure 4B:
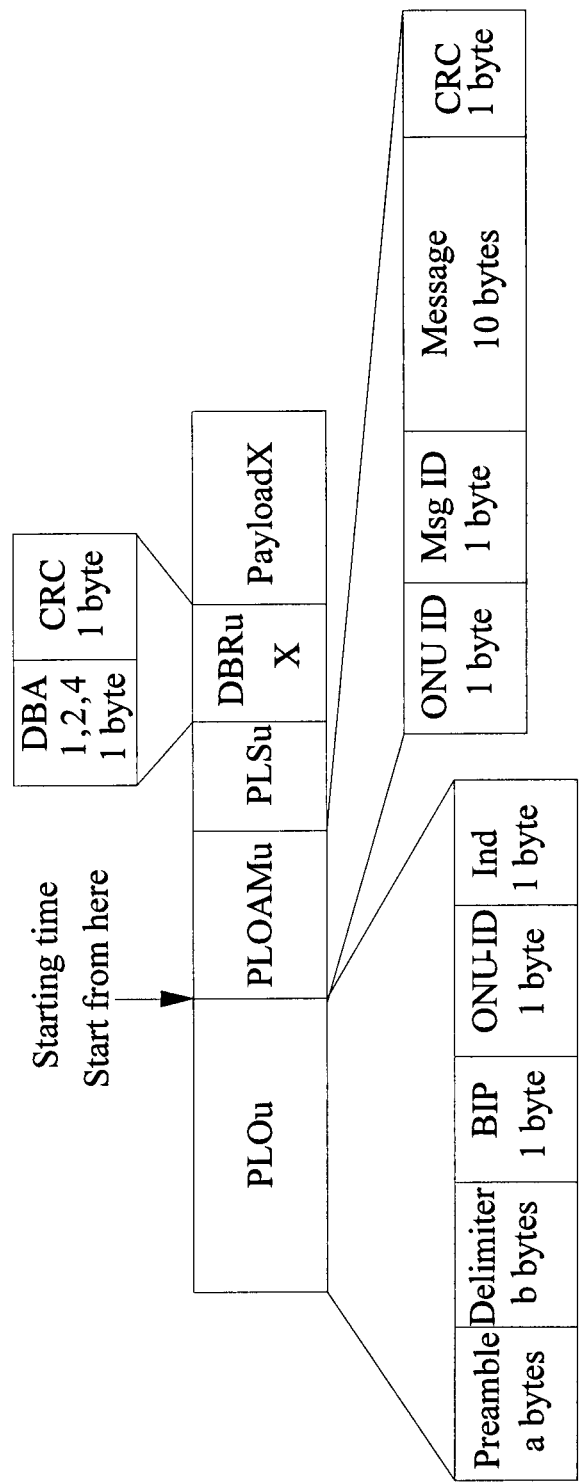
FIG. 4B is another schematic structural view of a GPON upstream data frame according to an embodiment of the present invention.

Referring to FIGS. 4A and 4B, schematic structural views of a GPON upstream data frame according to an embodiment of the present invention are shown. Each ONU sends upstream burst data packets to the OLT in the T-CONT assigned by the OLT, in which the upstream burst data packet includes an overhead area and a payload area. The overhead area includes a Physical Layer Overhead upstream (PLOu) domain, a Physical Layer OAM upstream (PLOAMu) domain, a Physical Layer Sequence upstream (PLSu) domain used to adjust power, and a Dynamic Bandwidth Report upstream (DBRu) domain. The PLOu domain is used to implement burst synchronization, and includes a preamble, a delimiter, and a BIP. After occupying an upstream channel, the ONU firstly sends the PLOu unit to the OLT, so that the OLT is able to implement the fast synchronization with the ONU and correctly receive effective upstream data of the ONU. The PLOAMu domain is used to bear upstream PLOAM information and the upstream PLOAM information includes an ONU ID, a Message ID, a Message, and a Cyclic Redundancy Code (CRC).

The DBA is a mechanism for dynamically changing the upstream bandwidth of each ONU in a level of microsecond or millisecond, and has the following principle. The OLT knows congestion situations by checking a DBA report from the ONU and/or by self-monitoring input service flow, then the OLT assigns bandwidth according to bandwidth resources, and the priority and the type of the T-CONT, in which the T-CONT corresponding to the service having a high priority firstly acquires the assignment of the assured bandwidth, for example, a 2 M private line is the service having a high priority, and the payload area of the assigned T-CONT is certainly larger than 2 M; and the OLT assigns the residual bandwidth among the services having the low priorities according to bandwidth requests and in proportion. A DBA algorithm is completed by the OLT, input parameters of the algorithm include priority of the T-CONT, bandwidth request, and link bandwidth capacity, an output of the algorithm is the BW-MAP which is used to control a specific time-slot position of the upstream bandwidth of the ONU. The OLT sends a bandwidth assignment result after the DBA algorithm to each ONU in a mode of configuration data, and each ONU sends the data to the OLT on the new time-slot position of the newly assigned bandwidth.

By using the DBA, a utilizing efficiency of the PON upstream bandwidth is improved, so that the network operator may provide services for more subscribers under a given bandwidth. Meanwhile, different service levels may be provided for different subscribers through the DBA. For example, the TC layer of the GPON specifies 5 types of T-CONT bandwidth (Type 1, 2, 3, 4, and 5), that is, fixed bandwidth, assured bandwidth, burst bandwidth, utmost bandwidth, and mixed bandwidth. The DBA function is implemented in all the T-CONT types. In the GEM mode, a GEM connection is identified by a GEM port, and is borne by a T-CONT bandwidth type according to a QoS demand.

The DBA in the GPON assigns the line bandwidth according to the priority, the bandwidth resource of the line, and the requested bandwidth of each ONU, so that the service having a high priority (for example, the private line and the video service) may be preferentially sent and has the assured bandwidth, and the services having the low priority may acquire the average bandwidth of the residual bandwidth in proportion. Therefore, the bandwidth is dynamically assigned, and the possibility of congestion is decreased.

Figure 5:
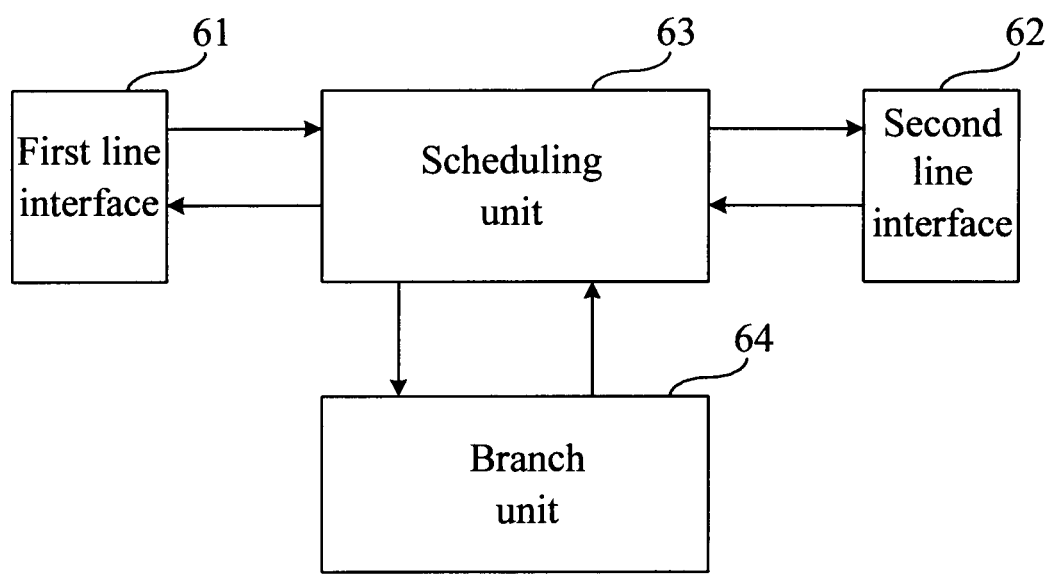
FIG. 5 is a schematic structural view of a packet add/drop multiplexer according to a first embodiment of the present invention.

Referring to FIG. 5, a schematic structural view of a packet add/drop multiplexer according to a first embodiment of the present invention is shown. The device includes a line interface unit, a scheduling unit 63, and at least one branch unit 64.

The line interface unit includes a first line interface 61, configured to receive a data frame of an input transporting side; and a second line interface 62, configured to send a data frame of an output transporting side, in which the first line interface 61 and the second line interface 62 may be respectively an east line interface and a west line interface.

The scheduling unit 63 is configured to drop the data frame of the input transporting side received by the first line interface 61, send a first T-CONT data packet in the data frame of the input transporting side to the branch unit, in which a destination NE ID of the first T-CONT data packet is a local NE ID; buffer a second T-CONT data packet in the data frame of the input transporting side, and perform a rate adjustment on the buffered second T-CONT data packet, in which a destination NE ID of the second T-CONT data packet is a non-local NE ID. A format of the data frame of the transporting side has a fixed-length frame format and a constant rate, in which the fixed-length frame format includes an overhead area and a payload area, and the payload area has a plurality of T-CONT time-slots used to load the T-CONT data packet of the transporting side.

The at least one branch unit 64 is configured to decapsulate the received first T-CONT data packet, extract a GEM data packet in the first T-CONT data packet, assemble the GEM data packet in a downstream data frame of the branch unit, and send the downstream data frame to a terminal; or extract a GEM data packet in an upstream data frame of the branch unit, encapsulate the GEM data packet in a third T-CONT data packet, and send the third T-CONT data packet.

The scheduling unit 63 is further configured to perform frame reassembly on the second T-CONT data packet after the rate adjustment and the third T-CONT data packet sent by the branch unit, generate the data frame of the output transporting side, and send the data frame of the output transporting side to the second line interface 62, in which a source NE ID of the third T-CONT data packet is a local NE ID.

The packet add/drop multiplexer in the first embodiment is a specific structure of each NE in FIG. 1, each NE is connected to other NEs through the first line interface 61 and the second line interface 62, and the data frame of the input transporting side and the data frame of the output transporting side are transported on two ring transporting links shown in FIG. 1.

The packet add/drop multiplexer in this embodiment may complete the scheduling function of dropping the first T-CONT data packet in the data frame of the transporting side, buffering the second T-CONT data packet, and performing the frame reassembly on the second T-CONT data packet after the rate adjustment and the third T-CONT data packet, on the transporting network side formed by the ring network, thereby dropping the first T-CONT data packet of the branch unit of the local NE, and adding the third T-CONT data packet of each branch unit of the local NE in the scheduling unit for performing the frame reassembly, that is, adding the third T-CONT data packet to the scheduling unit. Thus, the T-CONT data packet of the transporting side is directly dropped and added in the form of the data packet.

Figure 6:
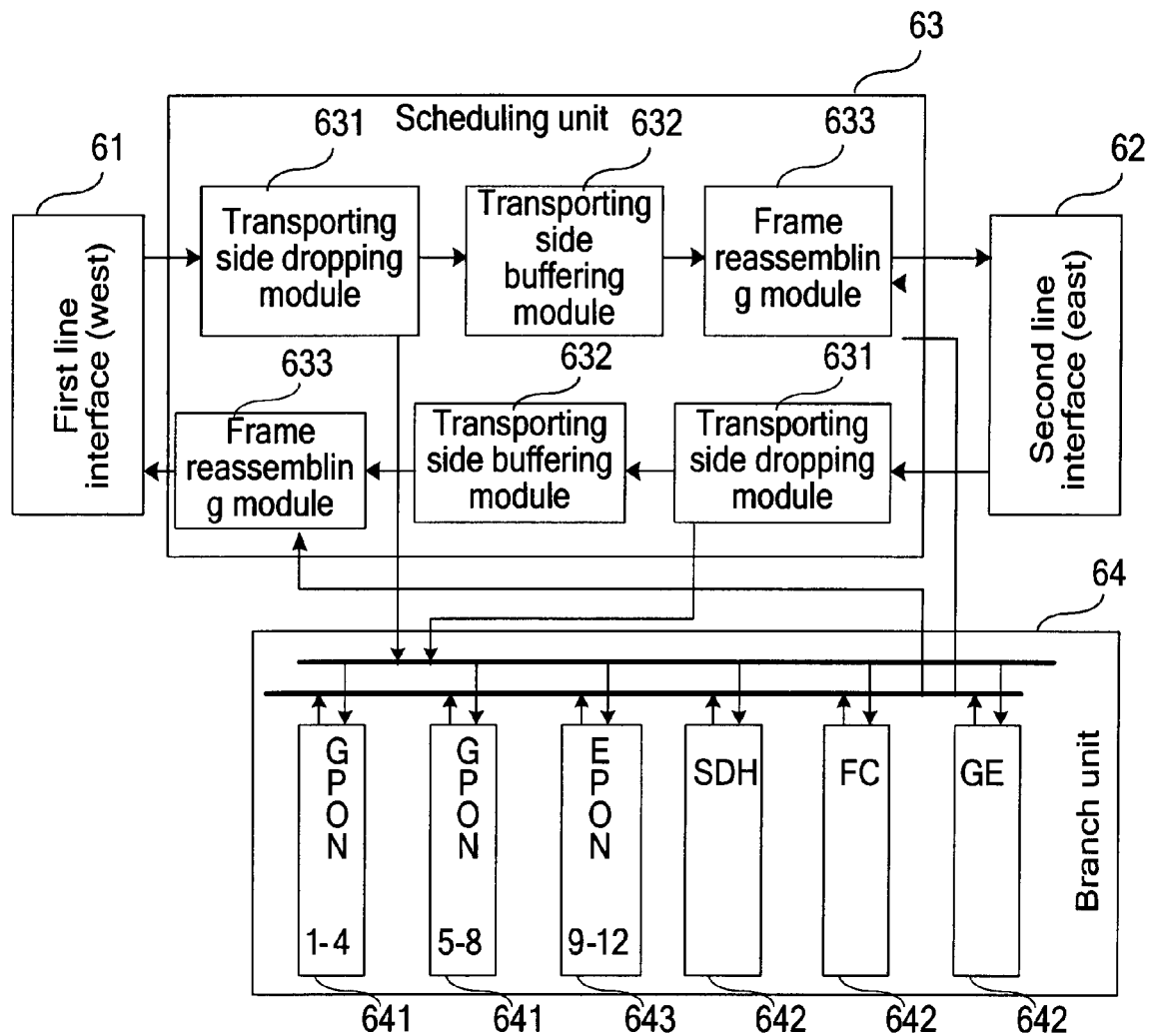
FIG. 6 is a schematic structural view of a packet add/drop multiplexer according to a second embodiment of the present invention.

Referring to FIG. 6, a schematic structural view of a packet add/drop multiplexer according to a second embodiment of the present invention is shown. In this embodiment, the device is connected to each NE through east and west dual transporting links. It is described in detail in this embodiment how to implement the packet add/drop multiplexing by the scheduling unit 63 in the structure of the packet add/drop multiplexer according to the embodiment, and how to encapsulate and decapsulate the T-CONT data packet by each branch unit 64.

1) First line interface (west) 61 and second line interface (east) 62

The device is connected to each node on the ring network shown in FIG. 2 through the first line interface 61 and the second line interface 62. The selection of a transporting link for the first line interface 61 and the second line interface 62 is flexible, that is, a transporting link of a GPON downstream data frame may be selected, or an OTUK of the OTN may be selected as the transporting link, and a rate may be 2.5 G or 10 G; when bandwidth demands are increased, the capacity may be expanded by utilizing the wavelength.

2) Scheduling unit 63

A transporting side dropping module 631 is configured to extract the T-CONT data packet of the transporting side from the data frame of the input transporting side according to an assigned T-CONT time-slot position, drop the first T-CONT data packet having the destination NE ID being the local NE ID according to a destination NE ID in the T-CONT data packet of the transporting side, and send the first T-CONT data packet to the branch unit 64. The T-CONT time-slot is provided by the DBA algorithm of the transporting side, and is provided by a DBA processing unit in the present invention, and the DBA processing unit is described in detail in the following embodiment.

The transporting side dropping module 631 is further configured to drop a broadcast T-CONT data packet and/or a multicast T-CONT data packet according to the destination NE ID in the T-CONT data packet of the transporting side, and send the broadcast T-CONT data packet and/or the multicast T-CONT data packet to the branch unit 64.

The transporting side buffering module 632 is configured to buffer the second T-CONT data packet being not dropped and sent to the branch unit, and perform the rate adjustment on the second T-CONT data packet by increasing or decreasing T-CONT idle packets. The transporting side buffering module 632 is further configured to continue transmitting the broadcast T-CONT data packet and/or the multicast T-CONT data packet. When the broadcast T-CONT data packet and/or the multicast T-CONT data packet are not only sent to the branch unit corresponding to one destination NE, after dropping the broadcast T-CONT data packet and/or the multicast T-CONT data packet of the local NE, the transporting side buffering module 632 continues transmitting the broadcast T-CONT data packet and/or the multicast T-CONT data packet on the transporting links, that is, replicates the broadcast T-CONT data packet and/or the multicast T-CONT data packet to the local NE.

The east and the west lines of the packet add/drop multiplexer shown in FIG. 6 may be separately timed, and has a fixed frequency difference, so that the transporting side buffering module 632 is configured to realize the rate adjustment on the second T-CONT data packet by increasing or decreasing the T-CONT idle packets. In order to realize the rate adjustment between the east and the west lines, the assigned T-CONT time-slot is always larger than a traffic of the T-CONT data packet of the transporting side, or on the transporting link between any nodes, for the assigned same T-CONT time-slot position, the frequency adjustment and the rate adaptation of the traffic of the T-CONT data packet of the transporting side are realized through a T-CONT time-slot positive insertion mode. Similarly, in the detailed description in the following, when the upstream of each branch of the branch unit 64 forms the T-CONT data packet of the transporting side, the rate adaptation between the traffic of the formed T-CONT data packet of the transporting side and the assigned T-CONT time-slot is realized through the T-CONT idle packet positive insertion mode.

A frame reassembling module 633 is configured to perform the frame reassembly on the second T-CONT data packet after the rate adjustment performed by the transporting side buffering module 632 and the third T-CONT data packet from the branch unit 64, generate the data frame of the output transporting side, and send the data frame of the output transporting side to the second line interface 62. All the second T-CONT data packets being not dropped and input to the transporting links are readapted to the transporting links according to the T-CONT time-slot positions assigned by the DBA processing unit of the local NE after the rate adjustment performed by the transporting side buffering module 632, and the frame reassembly is performed on the second T-CONT data packet and the third T-CONT data packet from the branch unit 64 and placed according to the T-CONT time-slot position assigned by the DBA processing unit of the local NE, so that clock frequency and frame positioning of all the data frames of the output transporting side sent from the second line interface 62 on the local NE are the same. When the broadcast T-CONT data packet and/or the multicast T-CONT data packet after the rate adjustment performed by the transporting side buffering module 632 exist, the frame reassembling module 633 performs the frame reassembly on the second T-CONT data packet, the broadcast T-CONT data packet and/or multicast T-CONT data packet after the rate adjustment and the third T-CONT data packet from the branch unit.

The data frame of the input transporting side may also be input from the second line interface 62, and is scheduled by the transporting side dropping module 631, the transporting side buffering module 632, and the frame reassembling module 633, and the finally sent data frame of the output transporting side may be output from the first line interface 61.

3) The branch unit 64 may be classified into two types of branch units, one type is a PON branch unit, for example, a GPON branch unit 641 or an EPON branch unit 643, in this embodiment, the branch unit 64 includes 2 GPON branch units, and the ODN of each GPON branch unit has 4 ONUs; and the other type is a virtual PON branch unit 642, which may be a GE branch unit, an SDH branch unit, or a Fiber Channel (FC) branch unit.

Taking the GPON branch unit as an example, on an upstream direction of the GPON branch unit, the TC layer of the GPON branch is terminated, that is, the GEM data packets are decapsulated from the upstream data frame, and then the GEM data packets are re-encapsulated to the third T-CONT data packet required by the transporting side.

Figure 7:
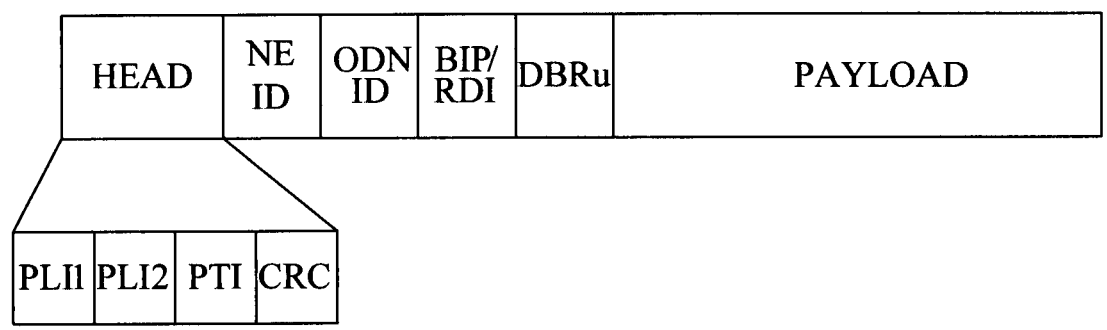
FIG. 7 is a schematic diagram of a frame structure of a T-CONT data packet of a transporting side according to an embodiment of the present invention.

Referring to FIG. 7, a schematic diagram of a frame structure of a T-CONT data packet of a transporting side according to an embodiment of the present invention is shown. The T-CONT data packets of the transporting side are data packets transported on the transporting links and encapsulated by the branch unit. The T-CONT data packets include a first T-CONT data packet, a second T-CONT data packet, and a third T-CONT data packet. The T-CONT data packet of the transporting side includes an overhead area and a payload area, the overhead area at least includes a destination NE ID, and further includes an ODN ID of the destination NE used to differentiate a plurality of OND branches in the GPON branch unit on each card. Specifically, when each third T-CONT data packet is formed according to each OND branch, or one third T-CONT data packet is formed according to the GPON branch unit on one card, an amount of the third T-CONT data packets sent to the frame reassembling module 633 is small, which facilitates bandwidth assignment and management. Here, the overhead area of the T-CONT data packet of the transporting side includes a destination NE ID and a destination ODN ID. When the third T-CONT data packets sent to the frame reassembling module 633 are differentiated and formed according to the priority of the service, for example, the service having a high priority respectively forms the independent third T-CONT data packets for being transported, and for the services having the low priority, as long as the destination NE is the same, the plurality of services having the low priority is shared to form a third T-CONT data packet. Here, after the TC layer of the branch of the service having a high priority of each GPON branch is terminated, the destination ODN ID is firstly added to the decapsulated GEM data packets, then the GEM data packets are converged to form a third T-CONT data packet, the destination ODN ID is not added to the overhead area of the third T-CONT data packet, and only the destination NE ID is added.

For the GPON branch unit, in the downstream direction, the received first T-CONT data packet, that is, the first T-CONT data packet dropped by the transporting side dropping module 631 in the scheduling unit 63, is further dropped. That is, the first T-CONT data packet corresponding to each ODN branch in the GPON branch unit on one card is dropped according to the ODN ID of the local NE. For example, one corresponding ODN branch in the GPON branch unit on the leftmost side card shown in FIG. 6 receives the first T-CONT data packet, decapsulates the first T-CONT data packet, recovers one or more GEM data packets in the payload area, then assembles the GEM data packets in the downstream data frame of the GPON branch unit, and sends the downstream data frame to the destination terminal. For the broadcast T-CONT data packet and/or the multicast T-CONT data packet sent to the card, if the data packet is the broadcast T-CONT data packet, the broadcast T-CONT data packet is replicated to all the terminals of all the GPON branches of the card; and if the data packet is the multicast T-CONT data packet, the multicast T-CONT data packet is replicated to the corresponding ODN branches belonging to the multicast group.

The virtual PON branch unit 642, that is, a common branch unit, being a non-PON branch unit, is configured to complete the local process of the local upstream and downstream private line services, without being connected to the ONU through the ODN network as the PON branch unit. For example, the GE branch unit shown in FIG. 6 directly maps a data signal in a GE protocol format to the GEM data packet, then encapsulates the GEM data packet to the third T-CONT data packet, writes the encapsulated third T-CONT data packet into the buffering module of the branch unit, and waits to send the third T-CONT data packet to the frame reassembling module 633 according to the assigned T-CONT time-slot position. The assigned T-CONT time-slot position is acquired according to the DBA algorithm of the transporting side, the third T-CONT data packet is read from the buffering module, and the third T-CONT data packet is then written into the corresponding T-CONT time-slot position. In the present invention, the common branch unit is defined as the virtual PON branch unit 642, and when the GEM data packets acquired by direct mapping form the third T-CONT data packet, the assignment of the ODN IDs and the assignment of the port IDs of the GEM data packets need to be performed.

In the two branch units, in addition to processing the encapsulating/decapsulating procedure of the T-CONT data packet of the transporting side, the branch unit 64 of a secondary node further generates a transporting side DBA request, sends the transporting side DBA request to a primary node NE for being computed, receives the transporting side BW-MAP returned by the primary node NE, and writes the T-CONT data packet of the transporting side to the corresponding T-CONT time-slot position according to the indicated T-CONT time-slot position. The procedure of sending the transporting side DBA request, computing and generating the transporting side BW-MAP is described in detail in the DBA processing unit in the following, after specific structures of various branch units are described. In addition, for the PON branch unit, the DBA request of the ODN branch needs to be processed, including a procedure of computing the bandwidth assignment map of each ONU according to the DBA request, the priority, and other parameters of the ONU, and sending the bandwidth assignment map to the corresponding ONU.

In the following, the specific structures of various branch units 64 are described, and it is described how to encapsulate and decapsulate the T-CONT data packet of the transporting side.

Figure 8A:
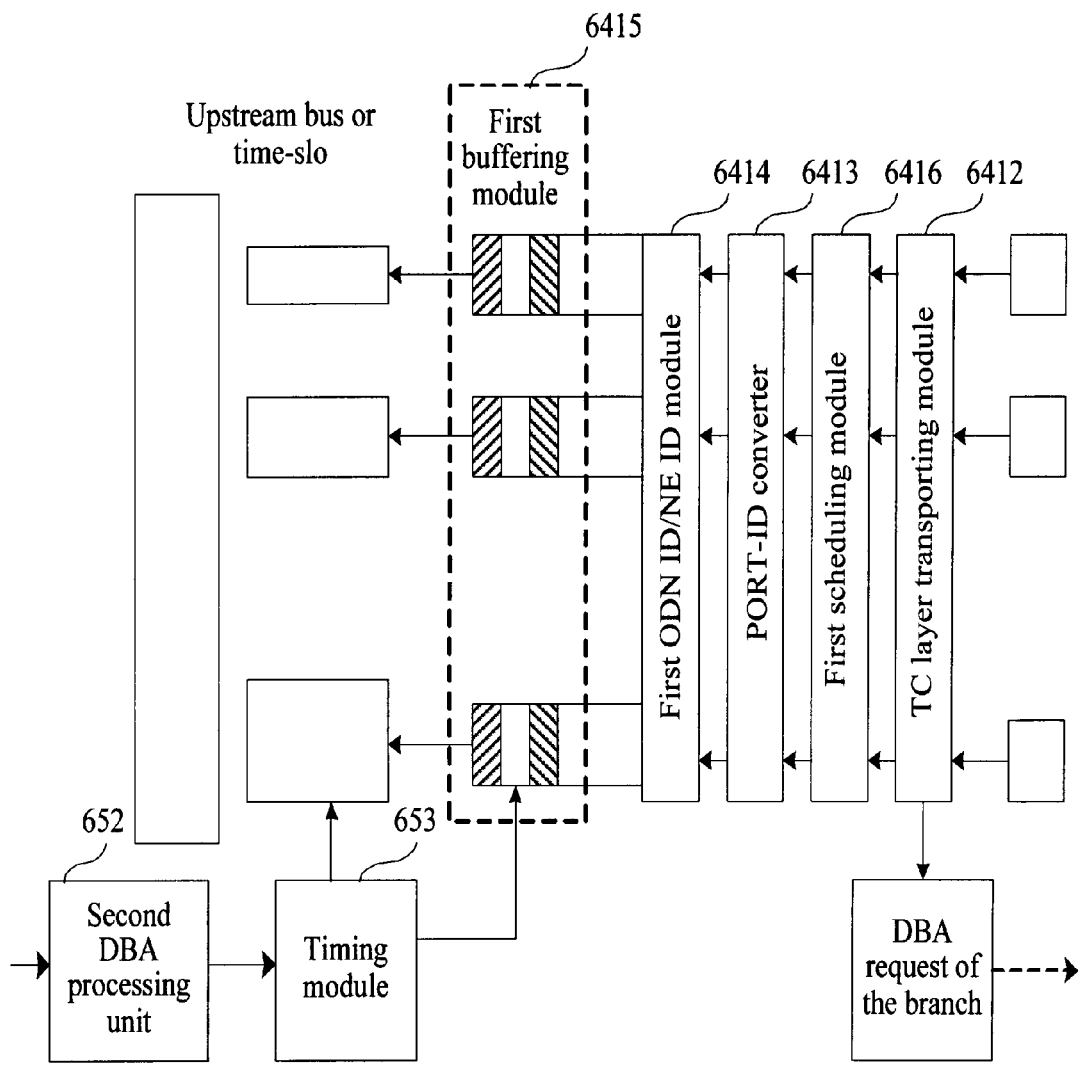
FIG. 8A is a schematic structural view of a GPON branch unit in a branch unit in a packet add/drop multiplexer according to the second embodiment of the present invention.

Referring to FIG. 8A, a schematic structural view of a GPON branch unit in a branch unit in a packet add/drop multiplexer according to the second embodiment of the present invention is shown. A structure of the GPON branch unit 641 is configured to describe how to encapsulate the data received by the GPON branch to the third T-CONT data packet. The structure includes the following parts:

1) A first physical layer (PHY) interface (not shown) is used to receive the PON upstream data frame sent by the terminal.

The received PON upstream data frame is the data packet formed on the ONU borne on a burst optical signal, in which the optical signal is converted to an electrical signal, and the data packet borne on the optical signal is extracted.

2) A TC processing module includes a TC layer transporting module 6412, configured to terminate the PON upstream data frame, including terminating the overhead area and extracting the GEM data packet of the payload area. The overhead area further includes the DBA request of the GPON branch unit, that is, the mentioned GPON branch unit processes the DBA request of its own, and assembles the downstream data frame according to the time-slot position indicated by the BE-MAP of its own when sending the downstream data frame to the terminal subscriber at the downstream.

3) A PORT-ID converter 6413 is mainly configured to process PORT-ID in the extracted GEM data packet, for example, in the ring network of FIG. 1, if the destination NE of the GEM packet of the branch unit is not the primary node NE, the PORT ID in the GEM data packet needs to be converted to the PORT ID of the ONU of the destination NE, so that it is helpful for the GPON branch unit connected to each node on the ring network to perform the ONU dropping on the T-CONT data packet of the transporting side.

4) A first ODN ID/NE ID module 6414 is configured to add the ID according to a mode for assembling the third T-CONT data packet. If all the GEM frames after the upstream traffic of each ODN is terminated form one third T-CONT data packet, the first ODN ID/NE ID module 6414 adds the ODN ID and the NE ID to the overhead area of the third T-CONT data packet. If the GEM frames after the upstream traffics of the different ODNs are terminated are assigned to the different third T-CONT data packets according to the priorities, the first ODN ID/NE ID module 6414 firstly adds the ODN ID to the received GEM data packet header, and adds the NE ID to the overhead of the assembled third T-CONT data packet. The branch unit 64 includes at least more than one GPON branch, so that the objective for adding the ODN ID is to differentiate each ODN branch of each GPON branch unit, that is, to differentiate the ODNs. The ODN ID includes a destination ODN ID and a source ODN ID. Being similar to the ODN ID, the NE ID is added to the overhead area of the assembled third T-CONT data packet, so as to differentiate the traffic of each NE, so that when the third T-CONT data packet passes the transporting side dropping module 631 of the scheduling unit 63 of the NE, the third T-CONT data packet is dropped and passes through the transporting side dropping module 631 according to the NE ID. The NE ID includes the destination NE ID and the source NE ID.

5) A first buffering module 6415 is configured to store the assembled third T-CONT data packet including the GEM data packets, write the third T-CONT data packet into a bus according to the assigned T-CONT time-slot position, and send the third T-CONT data packet. The first buffering module 6415 may be regarded as being formed by buffer areas, the third T-CONT data packet having a high priority is placed in the buffer area having a high priority, and the third T-CONT data packet having the low priority is placed in the buffer area having the low priority, in which the priority is set according to the amount of the priorities specified by the T-CONT of the transporting side. The objective of setting the priority buffer area is to preferentially ensure the transporting of the services having a high priority under a situation of limited bandwidth of the transporting side.

When the services having a high priority or the services having the low priority of each GPON branch are intensively processed, the TC layer processing module needs to further include a first scheduling module 6416, located between the TC layer transporting module 6412 and the PORT-ID converter 6413, and configured to schedule the services having the same priority of each terminal subscriber branch of the GPON branch unit to the buffer area having the same priority, which is applicable to a situation of insufficient transporting bandwidth. When the transport bandwidth is sufficient, the upstream traffic of each GPON branch may be respectively placed in the individual buffer area, and each T-CONT data packet of the transporting side has the same priority, so that the implementation is simple, and the first scheduling module 6416 is not required.

Referring to FIG. 7, a frame structure of a T-CONT data packet of a transporting side according to an embodiment of the present invention is shown. The detailed description is provided by taking the GPON branch unit as an example, and the T-CONT data packet of the transporting side in this embodiment is the third T-CONT data packet assembled in the upstream direction of the GPON branch unit. The frame structure of the T-CONT data packet of the transporting side is similar to the structure of the downstream data frame of the GPON branch (referring to FIG. 4), but is more simplified, and has a header similar to the delimiter of the GEM frame structure instead of the preamble and the delimiter in the downstream data frame, as shown in FIG. 2. The delimiting function is also completed by the header having 5 bytes, only the PORT ID in the header of the GEM frame structure in FIG. 2 is replaced by PLI2, and the PLI2 and the PLI1 in the header of the T-CONT data packet of the transporting side complete the length ID of the payload area, being an indicating scope of 20 bits. A fixed overhead byte exists after the header of the T-CONT data packet of the transporting side, and includes an NE ID, a BIP/Remote Defect Indication (RDI) byte, and a DBRu byte, and may also include an ODN ID byte under a particular situation. A payload type identifier (PTI) in the header indicates that the header is the T-CONT type, and it may be known whether the data packet is the T-CONT data packet or the common idle packet by judging the PTI. The payload area is the GEM data packets one by one, and at least includes one GEM data packet.

The synchronization and the delimitation of the T-CONT data packets of the transporting side are computed together with the T-CONT idle packets, and the T-CONT data packets of the transporting side and the T-CONT idle packets form the T-CONT data flow. The T-CONT idle packets function to perform the rate adaptation, including frequency adjustment demands from the branch to the transporting link, and between the transporting links. The synchronization and the delimitation of the GEM data packets of the payload areas in the T-CONT data packet of the transporting side are completed in the branch, that is, completed after the PON upstream data frame sent by the terminal subscriber is terminated. It is known that the frame structure of the T-CONT data packet of the transporting side is still the packet format, but at least includes more than one packet cascade. Only under an extreme situation, one T-CONT data packet of the transporting side loads only one GEM data packet.

In addition, the T-CONT time-slot in each frame of the frame structure of the T-CONT data packet of the transporting side is nearly fixed when the configuration data of the transporting side BW-MAP received by the branch unit remains unchanged. However, as long as the transporting links of the east line interface and the west line interface have the frequency difference, the T-CONT data packet of the transporting side may float in the assigned T-CONT time-slot. The referred float here is slightly different from the cross-frame placing of the GFP packet in the transporting network in the ODUK channel, in which the T-CONT data packet of the transporting side is placed in the data frame of the transporting side according to the T-CONT time-slot position, and may cross to the same T-CONT time-slot in another data frame of the transporting side. Similarly, the GEM data packet in the payload area of the T-CONT data packet of the transporting side may also float, and the GEM data packet may cross to the payload area of the next T-CONT data packet of the transporting side having the same T-CONT time-slot position.

The BIP/RDI byte in the frame structure of the T-CONT data packet of the transporting side is a performance management byte, the BIP is a frame check result of the previous T-CONT data packet of the transporting side; and the DBRu byte is the byte for reporting the transporting side DBA request. The format of the T-CONT packet includes performance management information, thereby realizing the end-to-end management from the source NE to the destination NE, so that the layer of the T-CONT data packet of the transporting side is the transporting channel layer.

An upstream bus shown in FIG. 8A is a parallel bus or serial bus having a period of 125 us, a rate of 1.24416 GBPS, 2.48832 GBPS, or 10 GBPS, which is determined according to the rate of the transporting link. The time-slot position of each T-CONT data packet of the transporting side on the bus is corresponding to the T-CONT time-slot assigned on the transporting link. A clock of the bus and a sending clock of the local NE have the same source.

The described GPON branch unit shown in FIG. 8A may be one of the branch units connected to the secondary node. The GPON branch unit further reports the transporting side DBA request to the primary node, and the transporting side DBA request may be a sum of the BW-MAPs computed by the DBA request of the GPON branch. The GPON branch unit may report the transporting side DBA request by carrying it in the DBRu overhead field in the frame structure of the third T-CONT data packet, or may report the transporting side DBA request by uniformly sending the transporting side DBA request to a DBA request processing unit. The bandwidth of the transporting side needs not to be changed as fast as the bandwidth of the GPON branch unit side bandwidth, so that the transporting side DBA request may not be updated at each frame, and an average value may be counted for a longer time, and then the average value is reported. The GPON branch unit further receives the transporting side BW-MAP returned by the primary node, and writes the third T-CONT data packet into a corresponding time-slot position on the upstream bus according to the assigned T-CONT time-slot.

Figure 8B:
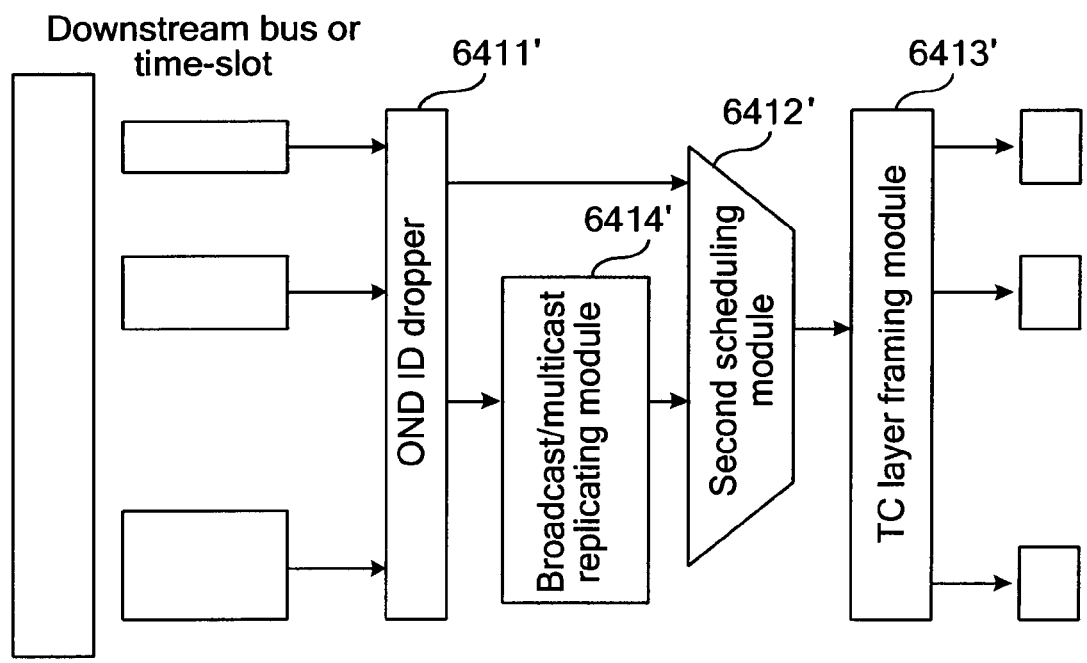
FIG. 8B is another schematic structural view of a GPON branch unit in a branch unit in a packet add/drop multiplexer according to the second embodiment of the present invention.

Referring to FIG. 8B, another schematic structural view of a GPON branch unit in a branch unit in a packet add/drop multiplexer according to the second embodiment of the present invention is shown. The structure of the GPON branch unit 641 is configured to describe how to decapsulate the first T-CONT data packet received by the GPON branch, place the data in the downstream data frame of the branch, and send the downstream data frame to the destination terminal. The structure includes the following parts.

1) An OND ID dropper 6411' is configured to drop the first T-CONT data packet corresponding to the ODN ID according to the ODN ID, and extract the GEM data packet in the first T-CONT data packet.

2) A second scheduling module 6412' is configured to schedule the GEM data packet according to the PORT ID of the destination terminal in the GEM data packet, send the GEM data packet to a buffer area of the downstream data frame of the GPON branch unit, in which the buffer area of the downstream data frame is used to buffer the scheduled GEM data packet.

3) A TC layer framing module 6413' is configured to assemble the GEM data packet in the buffer area of the downstream data frame in the GPON downstream data frame, and send the GPON downstream data frame to each destination terminal of each GPON branch unit.

The downstream of each GPON branch is independent, and for sake of convenience, the clock of the downstream data frame may be consistent with a phase of a frame positioning signal, in which both of the two uses the frame synchronization and the clock of the system as the reference.

4) An ODN ID dropper 6411' is further configured to extract the broadcast GEM data packet and/or the multicast GEM data packet in the broadcast T-CONT data packet and/or the multicast T-CONT data packet, the ODN ID dropper 6411' further includes a broadcast/multicast replicating module 6414' configured to replicate the broadcast GEM data packet and/or the multicast GEM data packet, and send the replicated plurality of broadcast GEM data packets and/or multicast GEM data packets to the second scheduling module 6412'. If the dropped data packet is the broadcast GEM data packet of the transporting side, the broadcast GEM data packet is scheduled by the second scheduling module 6412', assembled in the PON downstream data frame, and then sent to each destination terminal, that is, the ONU, of the GPON branch unit. If the dropped data packet is the multicast GEM data packet of the transporting side, the multicast GEM data packet is scheduled by the second scheduling module 6412', assembled in the PON downstream data frame, and then sent to the ONU destination terminal applying for the multicast of the GPON branch unit.

Figure 9:
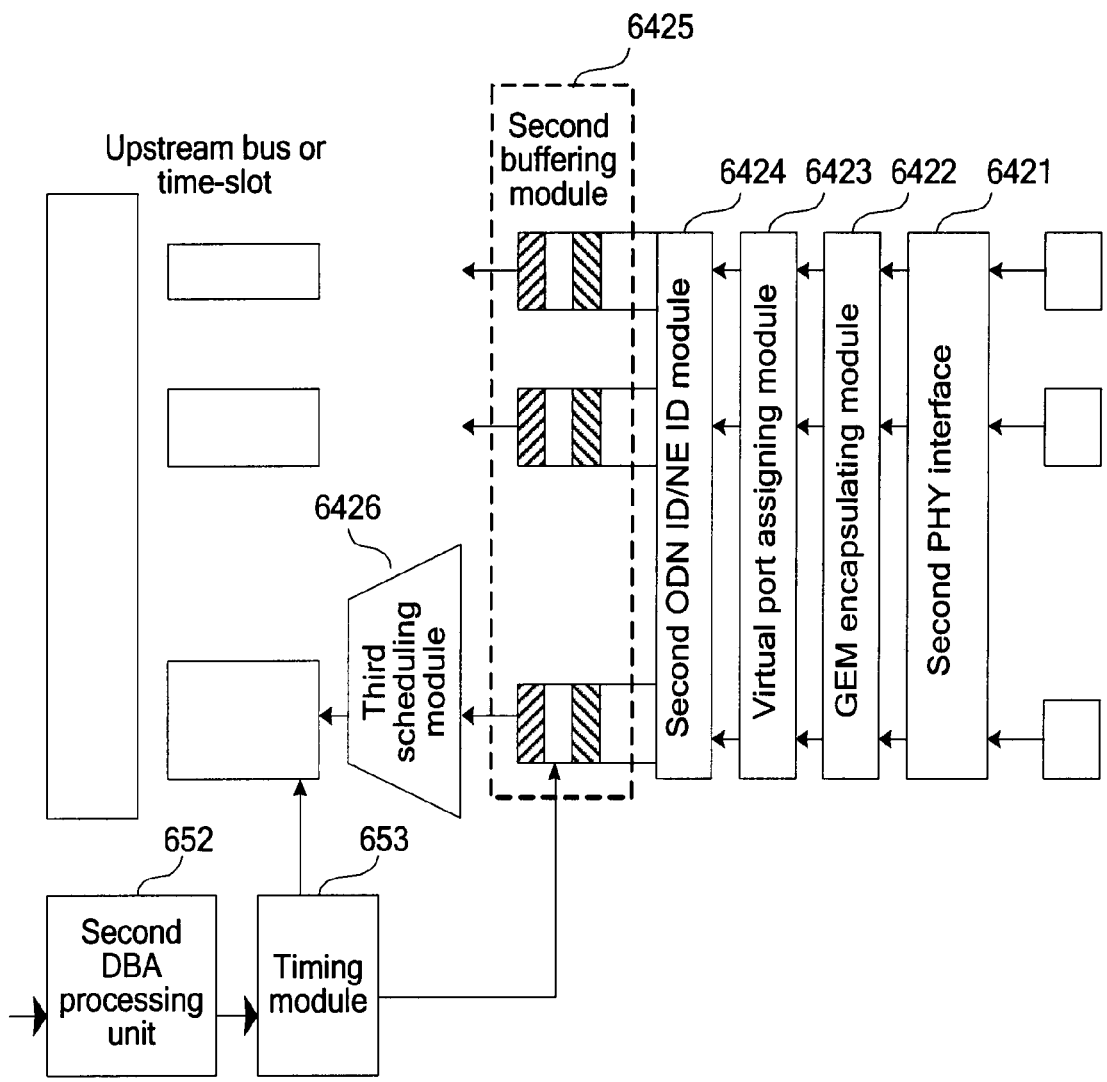
FIG. 9 is a schematic structural view of a virtual PON branch unit in a branch unit in a packet add/drop multiplexer according to the second embodiment of the present invention.

Referring to FIG. 9, a schematic structural view of a virtual PON branch unit in a branch unit in a packet add/drop multiplexer according to the second embodiment of the present invention is shown. The so-called virtual GPON branch refers to the common branch access, such as the GE and the FC, which is different from the GPON branch being accessed from the ONU. The structure of the virtual PON branch unit 642 is configured to describe how to encapsulate the data received by the common branch unit to the third T-CONT data packet. The virtual PON branch unit 642 includes the following parts:

1) A second PHY interface 6421 is included, and the data sent by the terminal is processed by the second PHY interface 6421 and enters the virtual PON branch.

2) A GEM encapsulating module 6422 is configured to encapsulate the data sent by the terminal to the GEM data packet. The encapsulation is differently performed according to different demands of transparency of the data, for example, if the bit is considered as transparent, the bit flow of the data is directly encapsulated to the GEM data packet, and if the MAC is considered as transparent, the MAC frame of the second PHY interface 6421 is extracted and then encapsulated to the GEM data packet.

3) A virtual port assigning module 6423 is configured to assign the PORT ID of the GEM data packet according to a Virtual Local Area Network (ULAN) or according to the data port.

4) A second ODN ID/NE ID module 6424 is configured to add the NE ID, or the ODN ID and the NE ID to the overhead area of the third T-CONT data packet. Being similar to the first ODN ID/NE ID module 6414 in the GPON branch unit 641, the second ODN ID/NE ID module 6424 adds the ODN ID/NE ID according to the different modes for assembling the third T-CONT data packet.

5) A second buffering module 6425 is configured to store the assembled third T-CONT data packet, write the third T-CONT data packet into the bus according to the assigned T-CONT time-slot position, and send the third T-CONT data packet. Being similar to the first buffering module 6415 in the GPON branch unit 641, the second buffering module 6425 divides the assembled third T-CONT data packets according to the priority, loads the private line or the service having a high priority by using the dedicated T-CONT, and loads the service having the low priority by using the T-CONT having the low priority.

The virtual PON branch unit 642 further includes a third scheduling module 6426, which is placed after the second buffering module 6425, and configured to schedule the priority of the third T-CONT data packet in the second buffering module 6425, and place the third T-CONT data packet in the corresponding time-slot position on the upstream bus according to the time-slot assigned by the transporting side BW-MAP.

The virtual PON branch unit 642 shown in FIG. 9 may be one of the branch units connected to the secondary node. The virtual PON branch unit 642 further reports the transporting side DBA request to the primary node, the branch unit is not the PON branch unit, so the branch unit does not have the DBA algorithm, so that the reported transporting side DBA request may be acquired by computing the residual bytes or computing the equivalent bandwidth after monitoring the state of the second buffering module 6425, and the reported transporting side DBA request is carried in the DBRu overhead field in the frame structure of the T-CONT data packet of the transporting side, or is uniformly sent to a DBA request processing unit on the branch unit for being reported.

The procedure of decapsulating the first T-CONT data packet of the virtual PON branch 642 in the branch unit in the packet add/drop multiplexer according to the second embodiment of the present invention is an inverse procedure of the procedure of encapsulating the third T-CONT data packet, and is similar to the structure of the GPON branch 641 of decapsulating the first T-CONT data packet, so it is not described in detail here.

In the packet add/drop multiplexer according to the second embodiment of the present invention, it is mainly described how to schedule the T-CONT data packet of the transporting side by the scheduling unit, how to decapsulate the received first T-CONT data packet by the branch unit, and how to encapsulate the data to the third T-CONT data packet and send the third T-CONT data packet to the scheduling unit. In packet add/drop multiplexer in this embodiment, the T-CONT data packet of the transporting side is directly dropped and added in the form of the packet, and the T-CONT time-slot is used to assign and control the bandwidth capacity of the transporting link. In addition, through the implementation of the structure of the virtual PON branch, the working mode of the NE may integrate the PON branch and the virtual PON branch, that is, through the virtual PON branch, the local private line access and the DBA application may be implemented, so that an application scope is expanded, and a more flexible private line transporting solution is provided.

In the embodiment, in the branch unit of the secondary node in FIG. 1, the upstream periodically sends the transporting side DBA request to the primary node NE, the downstream receives the transporting side BW-MAP returned by the primary node NE, and after receiving the transporting side BW-MAP, the branch unit of the secondary node writes the third T-CONT data packet into the corresponding time-slot position on the bus according to the assigned T-CONT time-slot. In the following, specific procedures that the branch unit of the secondary node NE generates and sends the transporting side DBA request, and the primary node NE processes the transporting side DBA request and returns the transporting side BW-MAP are thus described.

Figure 10:
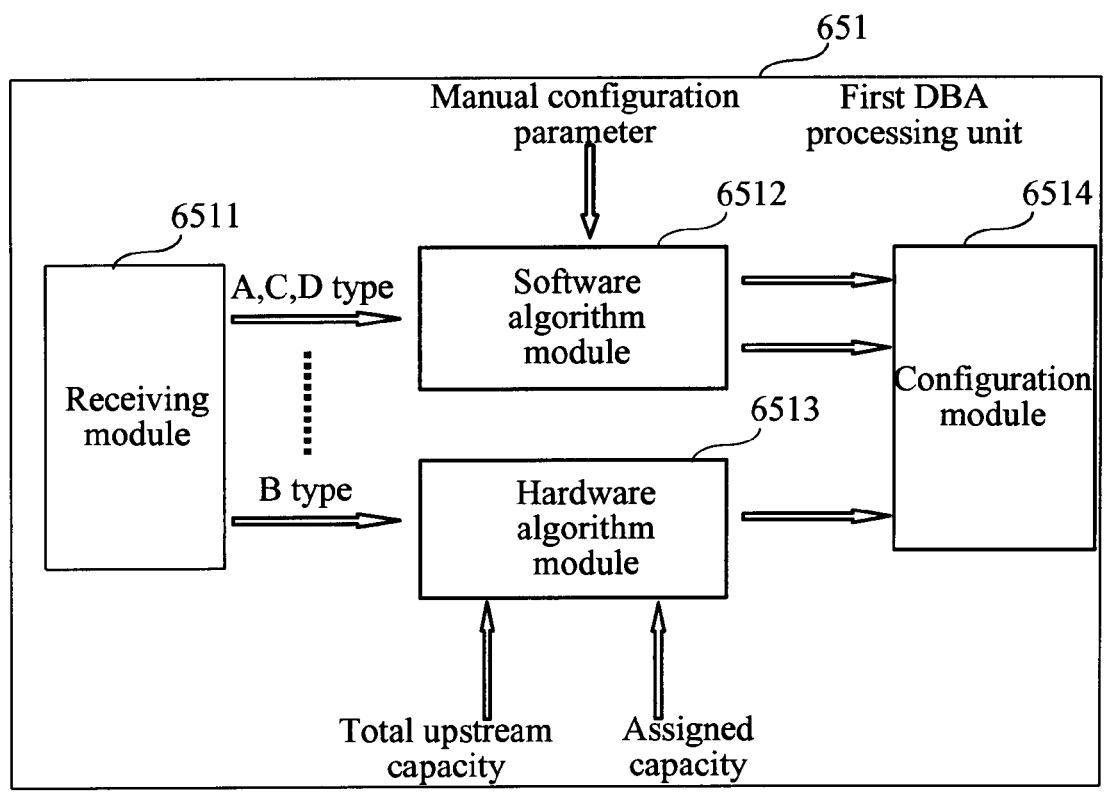
FIG. 10 is a schematic structural view of a first DBA processing unit 651 of a transporting side according to an embodiment of the present invention.

The packet add/drop multiplexer according to a third embodiment of the present invention further includes a DBA processing unit. To summarize the DBA in the embodiment, the DBA processing unit in the secondary node NE is configured to generate the transporting side DBA request, and send the transporting side DBA request to the primary node NE. The DBA processing unit in the primary node NE is configured to process the transporting side DBA request from the secondary node NE, acquires the transporting side BW-MAP through the DBA algorithm, and sends the transporting side BW-MAP to the corresponding secondary node NE. The secondary node NE receives the transporting side BW-MAP, and writes the third T-CONT data packet sent by the upstream of the branch into the corresponding time-slot position on the bus according to the indication. The DBA request processing unit according to the present invention includes a first DBA processing unit, as shown in FIG. 10, that is, the DBA processing unit in the primary node NE, which is configured to receive the transporting side DBA requests sent by the branch units of the different NEs, including the local NE and the non-local NE, and send the acquired transporting side BW-MAPs to the branch units on the corresponding NEs according to the DBA algorithm.

The first DBA processing unit 651 includes a receiving module 6511, configured to collect the transporting side DBA requests of all the NEs on the transporting network; a software algorithm module 6512 and a hardware algorithm module 6513, configured to perform the computation according to the types of the collected transporting side DBA requests, in combination with the link bandwidth capacity and/or the configuration parameters, and output the configuration data of the T-CONT data packets of the transporting side corresponding to the transporting side DBA requests, in which the software algorithm module 6512 combines the manual configuration parameters, and the hardware algorithm module 6513 mainly combines the total upstream bandwidth capacity and/or the assigned bandwidth capacity; and a configuration module 6514, configured to receive the configuration data, and perform the transporting. Specifically, the receiving module 6511 collects the transporting side DBA request R(i, j) representing each transporting side sent from each secondary node NE, in which i represents a number of the T-CONT data packet of the transporting side, and j represents the priority and is corresponding the priorities of the four services being A, B, C, and D. The A type service is a fixed bandwidth service, for example, the TDM service or data private line service; the B type service is an assured bandwidth service, for example, video service; the C type service is an un-assured bandwidth service; and the D type service is an utmost service, for example, network access service. The hardware algorithm module 6513 performs the computation based on the DBA algorithm of the transporting side according to the types of the transporting side DBA requests and the link capacity, such as the total upstream capacity and the residual upstream capacity. A computed output result is the new configuration data of the T-CONT data packet of the transporting side, which includes a starting position of the T-CONT timeslot and/or an amount of the T-CONT time-slots, and the result is sent to the configuration module 6514 for being transported.

In the structure of the branch unit shown in FIG. 8A and FIG. 9, the DBA processing unit further includes a second DBA processing unit 652, that is, the DBA processing unit of the secondary node NE, which is configured to collect the transporting side DBA request of the branch unit of the local NE, report the transporting side DBA request to the first DBA processing unit 651, and further configured to receive the transporting side BW-MAP returned by the first DBA processing unit 651.

The second DBA processing unit 652 is further embedded in the branch unit, configured to generate the transporting side DBA request by detecting the state of the transporting side buffering module or analyzing the DBA of the branch unit, carry the transporting side DBA request in the third T-CONT data packet, and report the third T-CONT data packet to the first DBA processing unit 651, and also configured to receive the transporting side BW-MAP sent by the first DBA processing unit 651.

In addition, the DBA processing unit further includes a timing module 653, as shown in FIG. 8A and FIG. 9, configured to generate a read/write timing according to an indication of the transporting side BW-MAP, control the third T-CONT data packet buffered by the first buffering module of the PON branch unit to be read from the buffer and written into the bus according to the assigned T-CONT time-slot position, and control the third T-CONT data packet buffered by the second buffering module of the virtual PON branch unit 642 to be read from the buffer and written into the bus according to the assigned T-CONT time-slot position.

In this embodiment, the DBA processing unit may control the fair assignment of the bandwidth on the transporting network of the third T-CONT data packet of the upstream of each branch unit in the packet add/drop multiplexer, and the fair assignment is performed among the nodes of the ring network, so that the nodes may share the bandwidth resources of the transporting links, thereby improving the utilizing efficiency of the bandwidth resources, equivalently increasing the expandability of the transporting network, and avoiding the problem of the insufficient upstream bandwidth due to the increasing of the single node subscriber.

In this embodiment, the transporting side DBA request is processed by using the T-CONT data packet of the transporting side as a unit, and each T-CONT data packet of the transporting side is corresponding to one transporting side DBA request and one transporting side BW-MAP. In addition, in the PON branch unit, the transporting side BW-MAP needs not to be changed as fast as the BW-MAP of the local PON branch, so that the transporting side DBA request of each branch may be averaged for several times and reported to the primary node NE for being processed, so as to decrease the processing traffic of the primary node NE. When the line bandwidth is larger than a sum of the maximum capacities of all the upstream bandwidth, the DBA processing unit may assign the bandwidth according to the maximum bandwidth application; however, under most situations, the upstream bandwidth needs to be converged, so as to decrease the bandwidth demands on the backbone network, particularly under the situation of the early stage of establishing the work, in which the subscribers are less and the traffic is low. In this embodiment, the loop bandwidth of the packet ring network and the fair sharing characteristic of the DBA processing unit have the bandwidth convergence characteristic, particularly, when the subscribers are increased, as the total upstream capacity exceeds the line capacity, the DBA processing unit may assure that the service having a high priority still has the assured bandwidth or the fixed bandwidth, and the service having the low priority may acquire the assigned bandwidth in proportion, so as to avoid the total congestion.

Figure 11:
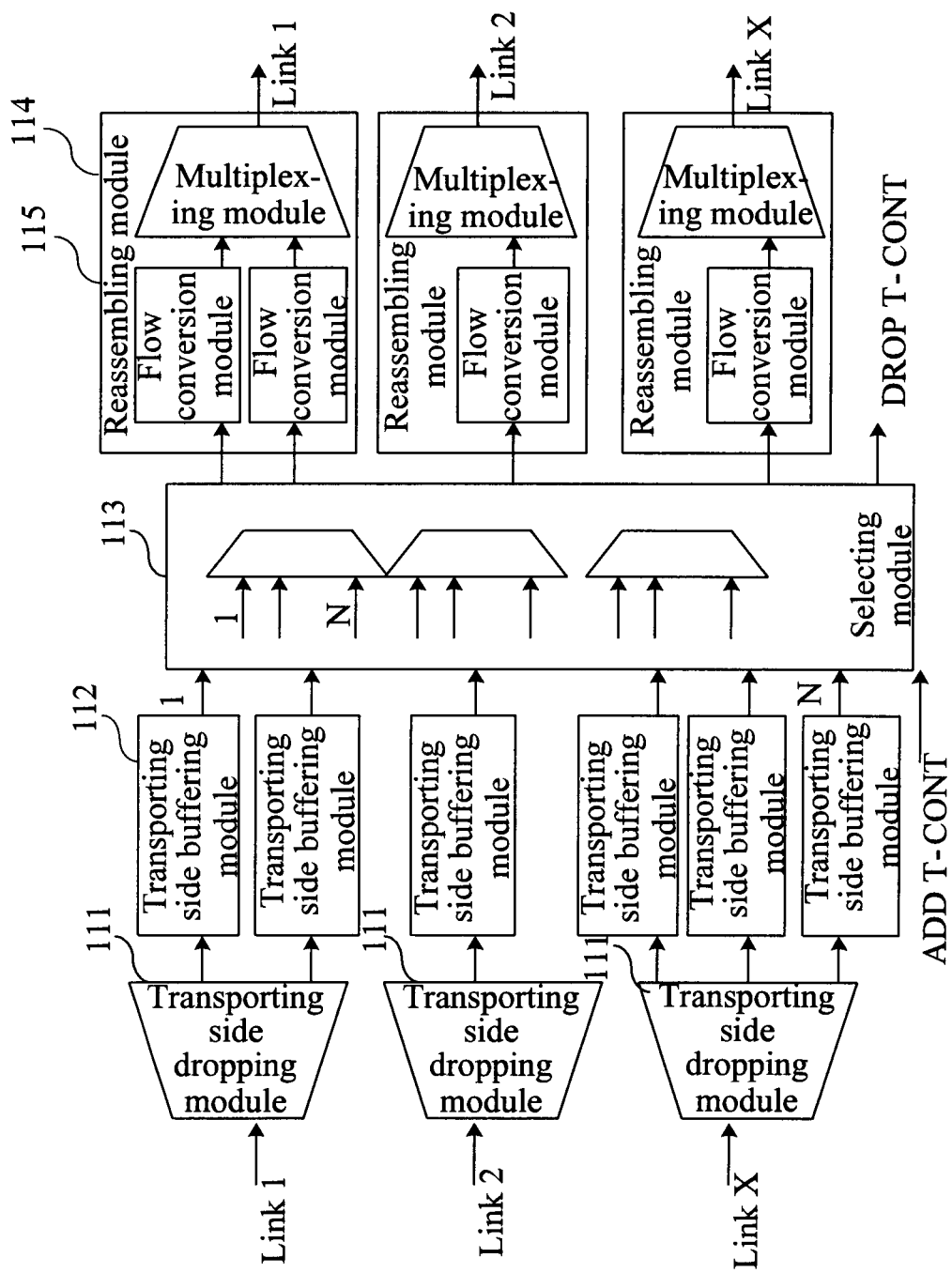
FIG. 11 is a schematic structural view of a transporting side crossing unit in a packet add/drop multiplexer according to an embodiment of the present invention.

Referring to FIG. 11, a structure of a scheduling unit when the packet add/drop multiplexer is applied to multi-transporting link according to an embodiment of the present invention is shown, which is a structure of a transporting side crossing unit, and is a multi-link cross unit having multiple inputs and multiple outputs. With the fast increase of the data capacity, upgrade and expansion demands of the device can be satisfied with the cooperation of the multi-transporting link, so that the present invention provides a matrix structure supporting T-CONT cross among multiple links. Here, the scheduling unit includes the following parts:

1) A transporting side dropping module 111 is configured to extract the T-CONT data packet of the transporting side in the data frame of the transporting side according to the T-CONT time-slot position assigned according to the indication of the BW-MAP, drop the first T-CONT data packet having the destination NE ID being the local NE ID according to the destination NE ID in the T-CONT data packet of the transporting side, and send the first T-CONT data packet to the branch unit. The structure of the transported T-CONT data packet of the transporting side is the structure of the data packet and the data cascade packet, has the starting and the ending, and the packet is the data generated by the source end, and has the particular ID, thus satisfying the characteristic of the flow, so that the dropping of the T-CONT data packet of the transporting side in the solution is flow dropping, and the T-CONT data packet of the transporting side can also be referred to as the T-CONT data flow of the transporting side.

2) A transporting side buffering module 112 is configured to buffer the second T-CONT data packet being not dropped and sent to the branch unit, and perform the rate adjustment on the second T-CONT by increasing or decreasing the T-CONT idle packets. The size of the transporting side buffering module 112 should be enough to load the second T-CONT data packet having the maximum length. For sake of convenient switching, the length of the second T-CONT data packet should be within several limited ranges, so as to facilitate performing the cross scheduling among the second T-CONT data packets having different lengths.

3) A selecting module 113 is mainly configured to complete the cross and connection on the second T-CONT data packets that are from the different transporting links and have the same length, thereby achieving switching.

4) A reassembling module includes a multiplexing module 114, which is configured to perform the frame reassembly on the second T-CONT data packet of each transporting link after the cross and connection and the third T-CONT data packet from the branch unit according to the assigned T-CONT time-slot position, generate the data frame of the output transporting side, and send the data frame of the output transporting side to the second line interface 62.

Optionally, the reassembling module 114 includes a flow conversion module 115, which is configured to alter the destination NE ID of the second T-CONT data packet, or convert the destination ODN ID and the destination PORT ID in the payload are of the second T-CONT data packet, which is similar to wavelength conversion in WDM, thereby improving the capacity of the transmission bandwidth in the TDM technology. Usually, the conversion of the destination NE ID is completed by the branch card of the source node. It may be known from FIG. 11 that the T-CONT data packets of the transporting side that are in any data frame of the input transporting side and have the same length may be scheduled to the output port of any transporting link. The cross scheduling is performed on the flows having the same length, so that the amount of the T-CONT data packets of the transporting side in each data frame of the input transporting side and data frame of the output transporting side is not changed, except for the adding and dropping situation of the local NE.

For the process of the transporting side DBA request under the multi-transporting link, this embodiment is mainly configured for metropolitan area convergence, the convergence services occupy the most part, and a small number of private line services requiring the scheduling may be manually configured, that is, after manual parameter configuration is performed, the residual bandwidth is configured to process the transporting side DBA request. In principle, the DBA processing unit may also process a plurality of transporting links, that is, to uniformly assign the T-CONT time-slot by regarding the plurality of the transporting links as a large link. Definitely, the T-CONT time-slot may be separately assigned for each transporting link, and the DBA process of each transporting link may be independently performed, so that the expandability is better, and the process is much simpler. The specific procedure relevant to the DBA process is as described in the processing mode of the packet add/drop multiplexer having the dual-specific procedure in the embodiment.

Figure 12:
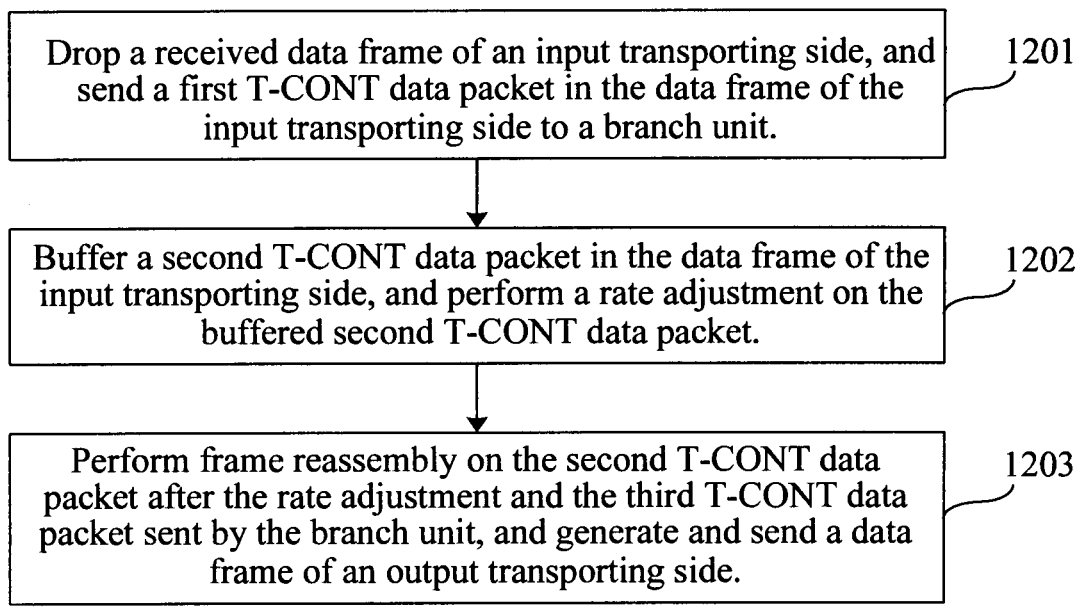
FIG. 12 is a flow chart of a data transmission method of a packet add/drop multiplexer according to a first embodiment of the present invention.

Referring to FIG. 12, a flow chart of a data transmission method of a packet add/drop multiplexer according to a first embodiment of the present invention is shown. The method includes the following steps:

Step 1201: Drop a received data frame of an input transporting side, send a first T-CONT data packet in the data frame of the input transporting side to a branch unit, in which a destination NE ID of the first T-CONT data packet is a local NE ID.

In step 1201, when the received data frame of the input transporting side is dropped, the first T-CONT data packet in the data frame of the input transporting side is sent to the branch unit, specifically, a T-CONT data packet of a transporting side is extracted from the data frame of the transporting side according to an assigned T-CONT time-slot position, the first T-CONT data packet having the destination NE ID being the local NE ID is dropped according to a destination NE ID in the T-CONT data packet of the transporting side, and the first T-CONT data packet is sent to the branch unit.

After receiving the first T-CONT data packet, the branch unit decapsulates the first T-CONT data packet, extracts a GEM data packet in the first T-CONT data packet, assembles the GEM data packet in a downstream data frame of the branch unit, and sends the downstream data frame to a terminal.

Step 1202: Buffer a second T-CONT data packet in the data frame of the input transporting side, and perform a rate adjustment on the buffered second T-CONT data packet, in which a destination NE ID of the second T-CONT data packet is a non-local NE ID.

In the step 1202, when the second T-CONT data packet is buffered in the data frame of the input transporting side, and the rate adjustment is performed on the buffered second T-CONT data packet, specifically, the second T-CONT data packet being not dropped and sent to the branch unit is buffered, and the rate adjustment is performed on the second T-CONT data packet by increasing or decreasing T-CONT idle packets.

Step 1203: Perform frame reassembly on the second T-CONT data packet after the rate adjustment and the third T-CONT data packet sent by the branch unit, and generate and send a data frame of an output transporting side, in which a source NE ID of the third T-CONT data packet is a local NE ID.

After the rate adjustment is performed on the second T-CONT data packet being not dropped, in the step 1203, the reassembly may be performed on the second T-CONT data packet and the third T-CONT data packet sent by each branch in the ring network, so as to realize the adding function of the packet add/drop multiplexing by using the packet as a unit.

For the third T-CONT data packet sent by the branch unit, the GEM data packet in the upstream data frame of the branch unit is extracted, the GEM data packet is encapsulated in the third T-CONT data packet, and the third T-CONT data packet is sent.

In the data transmission method of the packet add/drop multiplexer according to the present invention, the function of dropping the first T-CONT data packet may be completed, the second T-CONT data packet being not dropped may be buffered, and the frame reassembly is performed on the second T-CONT data packet being not dropped and the third T-CONT data packet formed by the service data added by the branch unit, and thus, the T-CONT data packet of the transporting side is directly dropped and added in the form of the data packet, and the T-CONT time-slot may be used to assign and control the capacity of the transporting link.

Figure 13:
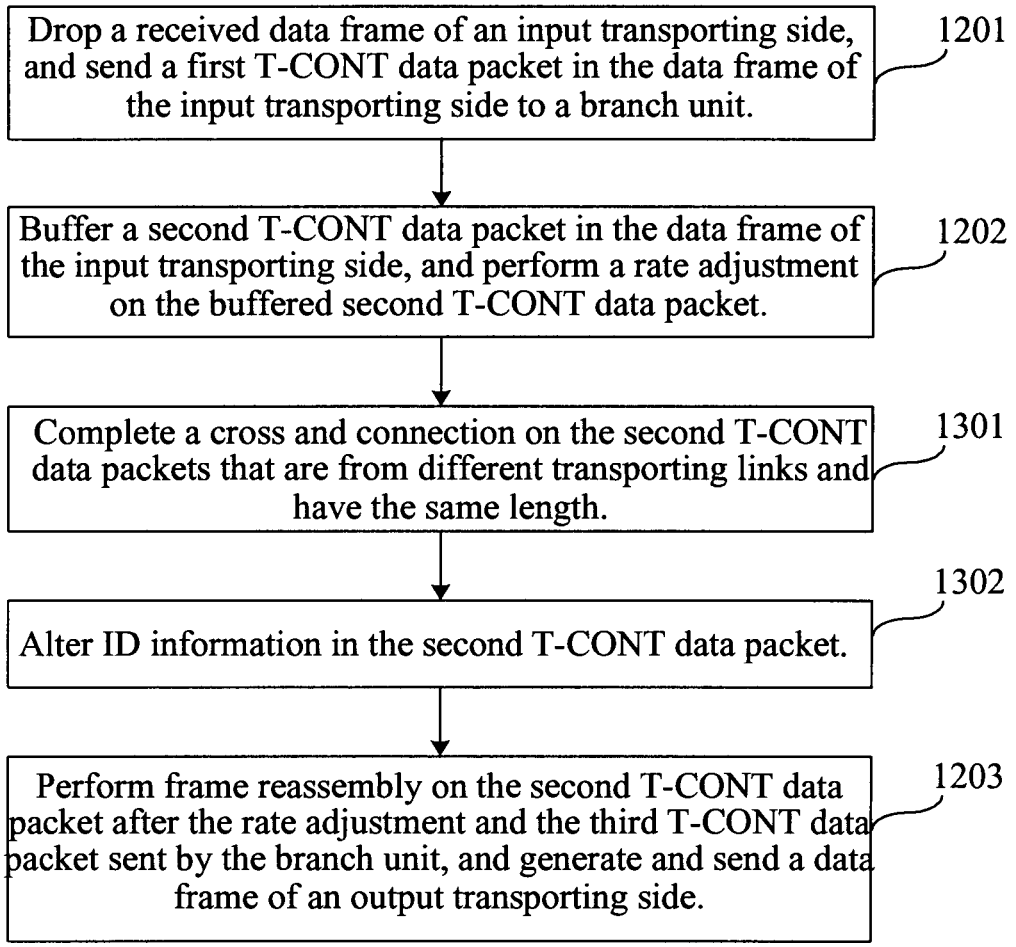
FIG. 13 is a flow chart of a data transmission method of a packet add/drop multiplexer according to a second embodiment of the present invention.

Referring to FIG. 13, a flow chart of a data transmission method of a packet add/drop multiplexer according to a second embodiment of the present invention is shown. This embodiment is different from the first embodiment in that the data transmission method transmits the data based on a plurality of transporting links of the transporting side, and between steps 1202 and 1203 of the first embodiment, the method further includes the following steps:

Step 1301: Complete a cross and connection on the second T-CONT data packets that are from different transporting links and have the same length.

Step 1302: Alter ID information in the second T-CONT data packet, in which the ID information includes a destination NE ID and/or a destination ODN ID and/or a destination PORT-ID.

In this embodiment, the T-CONT data packet of the transporting side is directly dropped and added in the form of the data packet, and the transporting time-slot may be used to assign and control the capacity of the link. In the two embodiments of the method, for the third T-CONT data packet sent by the PON branch unit, the GEM data packet in the upstream data frame of the branch unit is extracted, the GEM data packet is encapsulated in the third T-CONT data packet, and the third T-CONT data packet is sent. The procedure includes the following steps:

Step 1401: Receive a PON upstream data frame sent by the terminal.

Step 1402: Terminate the PON upstream data frame, and extract a GEM data packet in a payload area of the PON upstream data frame.

Step 1403: Convert a PORT-ID in the GEM data packet to a PORT-ID of a destination terminal.

Step 1404: Add an NE ID, or add an ODN ID and an NE ID to an overhead area of the third T-CONT data packet assembled by the GEM data packet, according to a mode for assembling the third T-CONT data packet.

Step 1405: Store the assembled third T-CONT data packet, write the third T-CONT data packet into a bus according to the assigned T-CONT time-slot position, and send the third T-CONT data packet.

After receiving the first T-CONT data packet, the PON branch unit decapsulates the first T-CONT data packet, extracts the GEM data packet in the first T-CONT data packet, assembles the GEM data packet in the downstream data frame of the branch unit, and sends the downstream data frame to the terminal. The procedure includes the following steps:

Step 1501: Drop the first T-CONT data packet corresponding to the ODN ID according to the ODN ID, and extract the GEM data packet in the first T-CONT data packet.

Step 1502: Schedule the GEM data packet to a buffer area of the downstream data frame of the PON branch unit, according to a PORT-ID of a destination terminal in the GEM data packet.

Step 1503: Assemble the GEM data packet buffered in the buffer area of the downstream data frame to the PON downstream data frame, and send the PON downstream data frame to the corresponding destination terminal.

For the third T-CONT data packet sent by the virtual PON branch unit, the GEM data packet in the upstream data frame of the branch unit is extracted, the GEM data packet is encapsulated in the third T-CONT data packet, and the third T-CONT data packet is sent. The procedure includes the following steps:

Step 1601: Receive the data sent by the terminal.

Step 1602: Encapsulate the data sent by the terminal to the GEM data packet.

Step 1603: Assign a PORT-ID of the GEM data packet according to a VLAN or a port receiving the data.

Step 1604: Add an NE ID, or add an ODN ID and an NE ID to an overhead area of the third T-CONT data packet assembled by the GEM data packet, according to a mode for assembling the third T-CONT data packet.

Step 1605: Store the assembled third T-CONT data packet, write the third T-CONT data packet into a bus according to the assigned T-CONT time-slot position, and send the third T-CONT data packet.

When the branch unit encapsulates/decapsulates the T-CONT data packet of the transporting side, the secondary node NE of the ring network further collects a transporting side DBA request of the branch unit of the local NE, and sends the transporting side DBA request to a processing NE for processing the transporting side DBA request, in which the processing NE in this embodiment is a primary local NE. The primary node NE processes the received transporting side DBA request according to a DBA algorithm, and sends an acquired transporting side BW-MAP to the branch unit corresponding to the secondary node NE. The secondary node NE further generates a read/write timing according to indication of the transporting side BW-MAP, and controls the buffered third T-CONT data packet to be read from a buffer and written into a bus according to the assigned T-CONT time-slot position.

In the ring network, when the transporting side DBA request is sent to the primary node NE capable of performing the DBA, the following possibilities exist.

The transporting side DBA request uses the T-CONT data packet of the transporting side as the unit, taking the GPON branch as an example, if the upstream traffic of each GPON branch is respectively encapsulated in one T-CONT data packet of the transporting side, the acquired results of the DBA request of the GPON branch may be used as input parameters of the transporting side DBA request, the results of the DBA algorithm of the GPON branch are the GPON upstream BW-MAPs, and the sum of the BW-MAPs represents an upstream total bandwidth required by different services, that is, the bandwidth required by the T-CONT data packet of the transporting side. Therefore, the transporting side DBA request may be the sum of the BW-MAPs of the GPON branch.

For the transporting side DBA request, after all the burst packets from the ONU of the upstream of the GPON are de-mapped, all the GEM data packets form one T-CONT data packet of the transporting side, the T-CONT data packet of the transporting side is correspondingly stored in the transporting side buffering module, and the state of the transporting side buffering module may be known by monitoring the transporting side buffering module, so that the transporting side DBA request may use the residual bytes in the transporting side buffering module as state reports. The state reports may be transported in the overheads of the T-CONT data packet of the transporting side.

The bandwidth of the transporting side needs not to be changed as fast as that the bandwidth of the GPON branch unit side bandwidth, so that the transporting side DBA request may not be updated at each frame, and an average value may be counted for a longer time, and then the average value is reported to the primary node NE, so that the processing traffic is decreased, and the processing demands are lowered.

In addition, for the mode of reporting the transporting side DBA request, in addition to transporting the transporting side DBA request together with the T-CONT data packet of the transporting side, the transporting side DBA request may be uniformly reported from out-band, that is, the second DBA processing unit of each secondary node NE collects the transporting side DBA requests of all the branches, including the PON branch and the virtual PON branch, and then sends the transporting side DBA requests to the primary node NE for being processed.

After receiving the transporting side DBA requests sent in this mode, the primary node NE processes the transporting side DBA requests according to a certain algorithm, so as to generate the transporting side BW-MAPs.

Figure 14:
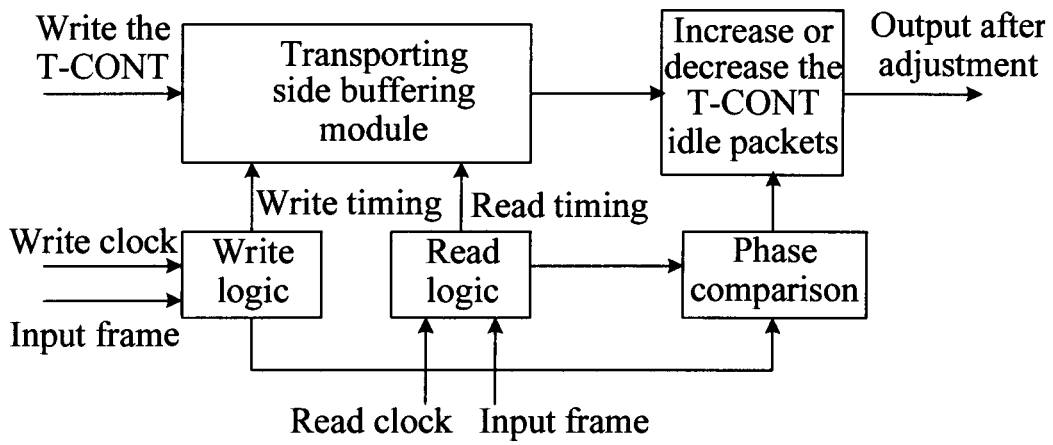
FIG. 14 is a schematic diagram of rate adjustment of link clock asynchronization in a data transmission method of a packet add/drop multiplexer according to an embodiment of the present invention.
Figure 15:
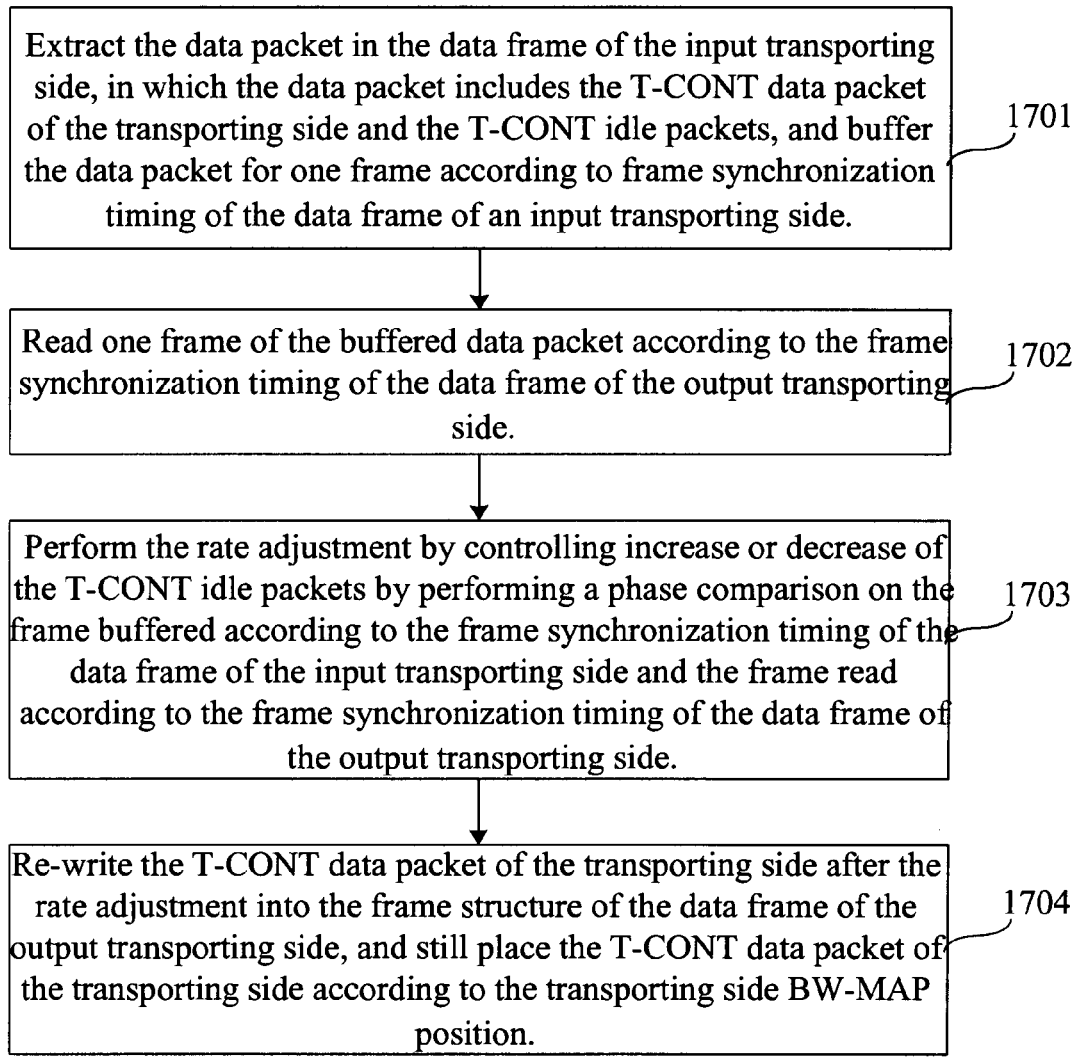
FIG. 15 is a flow chart of a method of rate adjustment of link clock asynchronization in a data transmission method of a packet add/drop multiplexer according to an embodiment of the present invention.

Referring to FIG. 14, it is a schematic diagram of rate adjustment of link clock asynchronization in a data transmission method of a packet add/drop multiplexer according to an embodiment of the present invention, when clocks of the east and the west links are asynchronous. In the data frame of the transporting side, the T-CONT idle packets exist between every two T-CONT data packets of the transporting side, the T-CONT idle packets are used to absorb the frequency difference of the rate adjustment, for example, the transporting side buffering module 632 is configured to perform the rate adjustment by increasing or decreasing the T-CONT idle packets. Referring to FIG. 15, the process of the rate adjustment of link clock asynchronization in the data transmission method of the packet add/drop multiplexer according to the present invention includes the following steps:

Step 1701: Extract the data packet in the data frame of the input transporting side, in which the data packet includes the T-CONT data packet of the transporting side and the T-CONT idle packets, and buffer the data packet for one frame according to frame synchronization timing of the data frame of an input transporting side;

Step 1702: Read one frame of the buffered data packet according to the frame synchronization timing of the data frame of the output transporting side.

Step 1703: Perform the rate adjustment by controlling increase or decrease of the T-CONT idle packets by performing a phase comparison on the frame buffered according to the frame synchronization timing of the data frame of the input transporting side and the frame read according to the frame synchronization timing of the data frame of the output transporting side.

Step 1704: Re-write the T-CONT data packet of the transporting side after the rate adjustment into the frame structure of the data frame of the output transporting side, and still place the T-CONT data packet of the transporting side according to the transporting side BW-MAP position.

When the write (east) clock is faster than the read (west) clock shown in FIG. 14, and when the phase is accumulated to a certain position, one idle packet is automatically decreased from the newly assembled frame, that is, the position of the original idle packet is used to load content of the T-CONT data packet of the transporting side, which is equivalent to the common payload deceleration in the transporting network. On the contrary, one T-CONT idle packet is inserted, so as to realize the rate adjustment function required by the T-CONT data packets of the transporting side on east and west due to the different line rates.

When the data service is encapsulated to the GEM packet on the branch, the idle packets between the GEM packets are used to adjust the rate difference between the rate of the data service and the rate of the payload area of the T-CONT data packet of the transporting side, in which the idle packets are equivalent to positive insertion. Similarly, the function of the T-CONT idle packet is also used to adjust the frequency difference among each NE in the network in the positive insertion mode. As long as the T-CONT time-slot assigned by the DBA processing unit to the T-CONT data packet of the transporting side is slightly larger than the practical traffic of the T-CONT data packet of the transporting side, the positive insertion mode can be realized. With the positive insertion mechanism, as long as the frequency difference among the NE does not exceed the adjustable range, the asynchronous works of the clocks of the east and the west link are tolerable.

Under the situation of the asynchronous work, the frame structures of the T-CONT time-slots on east and west are not changed relative to the positioning position of the frame, the frequency difference of the same time-slot of the east and west, and the floating of the T-CONT data packet of the transporting side and the T-CONT idle packet in the assigned T-CONT time-slot are changed. However, the capacities of the T-CONT time-slots are larger than the traffic of the T-CONT data packet of the transporting side to be transported, so that the packet loss will not occur. For the delivery of the transporting side BW-MAP under the situation of the asynchronous work of east and west, the transporting side BW-MAP in the input link needs to be replicated to the corresponding overhead of the output link, that is, the BW-MAP needs to pass through the east and the west, the BW-MAP may also be transported by adopting the format of the packet, and the idle packets tolerating the frequency difference exist among the packets, so that the BW-MAP may be transported after being carried on the overhead area or the payload area of the T-CONT data packet of the transporting side.

The adjusted rate uses the local sending clock as a reference, the input T-CONT time-slot positions of all the transporting links realize the frame alignment after being adjusted, and the scheduling of the multi-transporting link scheduling unit may be realized through the data switching among the transporting side buffering module having the same length. Through the adjustment, the asynchronization work among the NE may be implemented. The adjustment barely affects the performance of the data service, and is within the index range.

In step 1701 of the rate adjustment, when the data packet is buffered for one frame according to frame synchronization timing of the data frame of the input transporting side, a problem of delay exists. The cross network of each NE needs the transporting side buffering module to perform the buffering, so that the delay time of one frame is required. In order to decrease the processing delay of each T-CONT data packet of the transporting side, the mode of sub-frames may be adopted. For example, referring to FIG. 16, a frame structure of a T-CONT data flow of a transporting side assigned according to sub-frames according to an embodiment of the present invention is shown. The payload area of the existing frame structure of 125 microseconds is divided into several sub-frames, and in the assigned time-slot, the T-CONT data packets of the transporting side and the T-CONT idle packets in the data packet are placed in the sub-frames in sequence. As long as the length of the sub-frame is appropriate, the original delay of one frame may be decreased to the delay of one sub-frame. The T-CONT idle packets and the T-CONT data packet of the transporting side are placed in sequence from left to right and from top to bottom in the time-slot assigned by the TCONT 1. Under the multi-link situation, if the cross scheduling needs to be performed among the links, when one sub-frame comes, the cross scheduling may be performed without delaying for one frame.

The division of the sub-frames may adopt the frame structure of the STM-N and the sub-frame division mode, and the sub-rate adjustment or the overhead area rearrangement mechanism is not required. Alternatively, the division of the sub-frames may adopt the frame structure of the OTN, and for an Optical Transform Unit (OTU2), a repetition period is approximately 48 us, and the time of one row is 12 us, that is, if the cross scheduling is performed by adopting the mode, the delay time may be 12 us.

In the multi-link cross scheduling method and the rate adjustment method according to the present invention, the rate adjustment between the input and the output transporting links is implemented by increasing or decreasing the idle packets, so as to realize the asynchronous work among the NEs, and simplify the design demands of the clock system under the situation of all-data service. One condition of the adjustment implemented by increasing or decreasing the idle packets is that the positive insertion mode is adopted on the upstream of the source node NE. Further, through the application of the sub-frame structure, the delay resulting from the buffering performed according to the frame in the cross scheduling is reduced. The rate adjustment method is simple, and supports the multi-link capability, so as to better combine with the WDM technique, and improve the capacity expandability of the device.

It should be noted that the above embodiments are merely provided for elaborating the technical solutions of the present invention, but not intended to limit the present invention. Although the present invention has been described in detail with reference to the foregoing embodiments, it is apparent that person having ordinary skill in the art can make various modifications or equivalent replacements to the technical solutions of the invention without departing from the spirit and scope of the invention. Any modification, equivalent replacement, or improvement made without departing from the spirit and principle of the present invention should fall within the scope of the present invention.

What is claimed is:

1. A packet add/drop multiplexer, comprising:
a line interface unit, comprising a first line interface, configured to receive a data frame of an input transporting side; and a second line interface, configured to send a data frame of an output transporting side;
a scheduling unit, configured to: drop the received data frame of the input transporting side, send a first Transmission Container (T-CONT) data packet in the data frame of the input transporting side to a branch unit, wherein a destination Network Element (NE) identifier (ID) of the first T-CONT data packet is a local NE ID; buffer a second T-CONT data packet in the data frame of the input transporting side; and perform a rate adjustment on the buffered second T-CONT data packet, wherein a destination NE ID of the second T-CONT data packet is a non-local NE ID; and
at least one branch unit, configured to:
decapsulate the received first T-CONT data packet, extract a Gigabit-Capable Passive Optical Network (GPON) Encapsulation Method (GEM) data packet in the first T-CONT data packet, assemble the GEM data packet in a downstream data frame of the branch unit, and send the downstream data frame to a terminal; or
extract a GEM data packet in an upstream data frame of the branch unit encapsulate the GEM data packet in a third T-CONT data packet, and send the third T-CONT data packet;
wherein the scheduling unit is further configured to: perform frame reassembly on the second T-CONT data packet after the rate adjustment and the third T-CONT data packet sent b the branch unit, generate the data frame of the output transporting side, and send the data frame of the output transporting side to the second line interface, wherein a source NE ID of the third T-CONT data packet is a local NE ID, wherein the scheduling unit comprises:
a transporting side dropping module, configured to: extract a T-CONT data packet of a transporting side from the data frame of the input transporting side according to an assigned T-CONT time-slot position, drop the first T-CONT data packet whose the destination NE ID is the local NE ID according to a destination NE ID in the T-CONT data packet of the transporting side, and send the first T-CONT data packet to the branch unit;
a transporting side buffering module, configured to: buffer the second T-CONT data packet not being dropped and sent to the branch unit, and perform the rate adjustment on the second T-CONT data packet by increasing or decreasing T-CONT idle packets; and
a frame reassembling module, configured to: perform the frame reassembly on the second T-CONT data packet after the rate adjustment performed by the transporting side buffering module and the third T-CONT data packet from the branch unit, generate the data frame of the output transporting side, and send the data frame of the output transporting side to the second line interface.

2. The packet add/drop multiplexer according to claim 1, wherein
the transporting side dropping module is further configured to drop at least one of a broadcast T-CONT data packet and a multicast T-CONT data packet according to the destination NE ID in the T-CONT data packet of the transporting side;
the transporting side buffering module is further configured to buffer at least one of the broadcast T-CONT data packet and the multicast T-CONT data packet; and the frame reassembling module is further configured to:
perform the frame reassembly on at least one of the second T-CONT data packet, the broadcast T-CONT data packet, the multicast T-CONT data packet after the rate adjustment, and the third T-CONT data packet from the branch unit;
generate the data frame of the output transporting side; and
send the data frame of the output transporting side to the second line interface.

3. The packet add/drop multiplexer according to claim 1, wherein the branch unit is at least one of a Passive Optical Network (PON) branch unit, and a virtual PON branch unit.

4. The packet add/drop multiplexer according to claim 3, wherein the PON branch unit comprises:
a first physical layer interface, configured to receive a PON upstream data frame sent by the terminal;
a Transmission Convergence (TC) layer processing module, comprising a TC layer transporting module, configured to terminate the PON upstream data frame, and extract a GEM data packet in a payload area of the PON upstream data frame;
a PORT-ID converter, configured to convert a PORT-ID in the GEM data packet to a PORT-ID of a destination terminal;
a first Optical Distribution Network (ODN) ID/NE ID module, configured to add an NE ID, or add an ODN ID and an NE ID to an overhead area of the third T-CONT data packet assembled by the GEM data packet, according to a mode for assembling the third T-CONT data packet; and
a first buffering module, configured to store the assembled third T-CONT data packet, write the third T-CONT data packet into a bus according to the assigned T-CONT time-slot position, and send the third T-CONT data packet.

5. The packet add/drop multiplexer according to claim 4, wherein the TC layer processing module further comprises:
a first scheduling module, configured to: schedule the GEM data packet in the payload area of the PON upstream data frame extracted by the TC layer transporting module, and send the scheduled GEM data packet to the PORT-ID converter;
wherein the first buffering module is further configured to store the third T-CONT data packet assembled by the scheduled GEM data packet, according to a priority specified by the T-CONT of the transporting side.

6. The packet add/drop multiplexer according to claim 3, wherein the PON branch unit comprises:
an ODN ID dropper, configured to drop the first T-CONT data packet corresponding to an ODN ID according to the ODN ID, and extract the GEM data packet in the first T-CONT data packet;
a second scheduling module, configured to schedule the GEM data packet to a buffer area of the downstream data frame of the PON branch unit, according to a PORT-ID of a destination terminal in the GEM data packet; and
a TC layer framing module, configured to assemble the GEM data packet buffered in the buffer area of the downstream data frame to the PON downstream data frame, and send the PON downstream data frame to the corresponding destination terminal.

7. The packet add/drop multiplexer according to claim 6, wherein the ODN ID dropper is further configured to extract at least one of a broadcast GEM data packet and a multicast GEM data packet from at least one of the broadcast T-CONT data packet, and the multicast T-CONT data packet; and wherein the ODN ID dropper further comprises:
a broadcast/multicast replicating module, configured to: replicate at least one of the broadcast GEM data packet and the multicast GEM data packet, and send at least one of the replicated broadcast GEM data packets and the replicated multicast GEM data packets to the second scheduling module;
wherein the second scheduling module is further configured to schedule at least one of the broadcast GEM data packet and the multicast GEM data packet to the buffer area of the downstream data frame of the PON branch unit, according to at least one of the PORT-ID of the destination terminal in the broadcast GEM data packet and the multicast GEM data packet; and
wherein the TC layer framing module is further configured to assemble at least one of the broadcast GEM data packet and the multicast GEM data packet buffered in the buffer area of the downstream data frame to the PON downstream data frame, and send the PON downstream data frame to the corresponding destination terminal.

8. The packet add/drop multiplexer according to claim 3, wherein the virtual PON branch unit comprises:
a second physical layer interface, configured to receive data sent by the terminal;
a GEM encapsulating module, configured to encapsulate the data sent by the terminal to the GEM data packet;
a virtual port assigning module, configured to assign a PORT-ID of the GEM data packet according to a Virtual Local Area Network (VLAN) or a port receiving the data;
a second ODN ID /NE ID module, configured to add an NE ID, or add an ODN ID and an NE ID to an overhead area of the third T-CONT data packet assembled by the GEM data packet, according to a mode for assembling the third T-CONT data packet; and
a second buffering module, configured to store the assembled third T-CONT data packet, write the third T-CONT data packet into a bus according to the assigned T-CONT time-slot position, and send the third T-CONT data packet.

9. The packet add/drop multiplexer according to claim 1, further comprising: a dynamic bandwidth assignment (DBA) processing unit, configured to generate a transporting side DBA request, or configured to process the transporting side DBA request from the branch unit.

10. The packet add/drop multiplexer according to claim 9, wherein the DBA processing unit comprises:
a first DBA processing unit, configured to receive the transporting side DBA request sent by the branch units of a local NE and a non-local NE, and send acquired transporting side bandwidth (BW)-MAPs to corresponding branch units according to a DBA algorithm.

11. The packet add/drop multiplexer according to claim 9, wherein the DBA processing unit comprises:
a second DBA processing unit, configured to collect the transporting side DBA request of the branch unit of the local NE, and report the transporting side DBA request to a first DBA processing unit, and configured to receive a transporting side BW-MAP returned by the first DBA processing unit; or
a second DBA processing unit, embedded in the branch unit, configured to generate the transporting side DBA request by detecting a state of the transporting side buffering module or analyzing a DBA of the branch unit, carry the transporting side DBA request in the third T-CONT data packet, and report the third T-CONT data packet to a first DBA processing unit, and configured to receive a transporting side BW-MAP sent by the first DBA processing unit.

12. The packet add/drop multiplexer according to claim 11, wherein the second DBA processing unit further comprises:
a timing module, configured to generate a read/write timing according to indication of the transporting side BW-MAP, and control the buffered third T-CONT data packet to be read from a buffer and written into a bus according to the assigned T-CONT time-slot position.

13. A data transmission method of a packet add/drop multiplexer, comprising:
dropping a received data frame of an input transporting side, sending a first Transmission Container (T-CONT) data racket in the received data frame of the input transporting side to a branch unit, wherein a destination Network Element (NE) identifier (ID) of the first T-CONT data packet is a local NE ID; buffering a second T-CONT data packet in the received data frame of the input transporting side, and performing a rate adjustment on the buffered second T-CONT data packet, wherein a destination NE ID of the second T-CONT data packet is a non-local NE ID;
decapsulating the first T-CONT data packet received by the branch unit, extracting a Gigabit-Capable Passive Optical Network (GPON) Encapsulation Method (GEM) data packet in the first T-CONT data packet, assembling the GEM data packet in a downstream data frame of the branch unit, and sending the downstream data frame to a terminal;
extracting a GEM data packet in an upstream data frame of the branch unit, encapsulating the GEM data packet in a third T-CONT data packet and sending the third T-CONT data packet; and
performing frame reassembly on the second T-CONT data packet after the rate adjustment and the third T-CONT data packet sent by the branch unit generating a data frame of an output transporting side, and sending the data frame of the output transporting side, wherein a source NE ID of the third T-CONT data packet is a local NE ID, wherein:
the dropping the received data frame of the input transporting side, and sending the first T-CONT data packet in the received data frame of the input transporting side to the branch unit comprises: extracting a T-CONT data packet of a transporting side from the received data frame of the input transporting side according to an assigned T-CONT time-slot position, dropping the first T-CONT data packet whose the destination NE ID is the local NE ID according to a destination NE ID in the T-CONT data packet of the transporting side, and sending the first T-CONT data packet to the branch unit; and
the buffering the second T-CONT data packet in the received data frame of the input transporting side, and performing the rate adjustment on the buffered second T-CONT data packet comprises: buffering the second T-CONT data packet not being dropped and sent to the branch unit, and performing the rate adjustment on the second T-CONT data packet by increasing or decreasing T-CONT idle packets.

14. The data transmission method of the packet add/drop multiplexer according to claim 13, wherein the performing the rate adjustment on the second T-CONT data packet by increasing or decreasing the T-CONT idle packets comprises:
extracting the data packet in the data frame of the input transporting side, wherein the data packet comprises the T-CONT data packet of the transporting side and the T-CONT idle packets, and buffering the data packet for one frame according to frame synchronization timing of the received data frame of an input transporting side;

reading one frame of the buffered data packet according to the frame synchronization timing of the data frame of the output transporting side; and performing the rate adjustment by controlling the increase or decrease of the T-CONT idle packets by performing a phase comparison on a frame buffered according to the frame synchronization timing of the received data frame of the input transporting side and the frame read according to the frame synchronization timing of the data frame of the output transporting side.

15. The data transmission method of the packet add/drop multiplexer according to claim 14, wherein the buffering the data packet for one frame according to the frame synchronization timing of the received data frame of an input transporting side comprises:

dividing a payload area of the received data frame of the input transporting side into several sub-frames, and in the assigned T-CONT time-slot position, placing the T-CONT data packet of the transporting side and the T-CONT idle packets in the data packet in the sub-frames in sequence.

16. A data transmission method of a packet add/drop multiplexer comprising:

dropping a received data frame of an input transporting side, sending a first Transmission Container (T-CONT) data packet in the received data frame of the input transporting side to a branch unit, wherein a destination Network Element (NE) identifier (ID) of the first T-CONT data packet is a local NE ID; buffering a second T-CONT data packet in the received data frame of the input transporting side, and performing a rate adjustment on the buffered second T-CONT data packet, wherein a destination NE ID of the second T-CONT data packet is a non-local NE ID;

decapsulating the first T-CONT data packet received by the branch unit, extracting a Gigabit-Capable Passive Optical Network (GPON) Encapsulation Method (GEM) data packet in the first T-CONT data packet, assembling the GEM data packet in a downstream data frame of the branch unit, and sending the downstream data frame to a terminal;

extracting a GEM data packet in an upstream data frame of the branch unit, encapsulating the GEM data packet in a third T-CONT data packet, and sending the third T-CONT data packet; and performing frame reassembly on the second T-CONT data packet after the rate adjustment and the third T-CONT data packet sent by the branch unit, generating a data frame of an output transporting side, and sending the data frame of the output transporting side, wherein a source NE ID of the third T-CONT data packet is a local NE ID, wherein after the buffering the second T-CONT data packet in the received data frame of the input transporting side, and performing the rate adjustment on the buffered second T-CONT data packet, the method further comprises:

completing a cross and connection on the second T-CONT data packets that are from different transporting links and have the same length; and altering identifier (ID) information in the second T-CONT data packet, wherein the ID information comprises at least one of a destination NE ID, a destination optical distribution network (ODN) ID and a destination PORT-ID.

17. A data transmission method of a packet add/drop multiplexer, comprising:

dropping a received data frame of an input transporting side, sending a first Transmission Container (T-CONT) data packet in the received data frame of the input transporting side to a branch unit, wherein a destination Network Element (NE) identifier (ID) of the first T-CONT data packet is a local NE ID; buffering a second T-CONT data packet in the received data frame of the input transporting side, and performing a rate adjustment on the buffered second T-CONT data packet, wherein a destination NE ID of the second T-CONT data packet is a non-local NE ID;

decapsulating the first T-CONT data packet received by the branch unit, extracting a Gigabit-Capable Passive Optical Network (GPON) Encapsulation Method (GEM) data packet in the first T-CONT data packet assembling the GEM data packet in a downstream data frame of the branch unit, and sending the downstream data frame to a terminal;

extracting a GEM data packet in an upstream data frame of the branch unit, encapsulating the GEM data packet in a third T-CONT data packet, and sending the third T-CONT data packet; and performing frame reassembly on the second T-CONT data packet after the rate adjustment and the third T-CONT data packet sent by the branch unit, generating a data frame of an output transporting side, and sending the data frame of the output transporting side, wherein a source NE ID of the third T-CONT data packet is a local NE ID, wherein the extracting the GEM data packet in the upstream data frame of the branch unit, encapsulating the GEM data packet in the third T-CONT data packet, and sending the third T-CONT data packet comprises:

receiving a Passive Optical Network (PON) upstream data frame sent by the terminal;

terminating the PON upstream data frame, and extracting a GEM data packet in a payload area of the PON upstream data frame;

converting a PORT-ID in the GEM data packet to a PORT-ID of a destination terminal;

adding an NE ID, or adding an ODN ID and an NE ID to an overhead area of the third T-CONT data packet assembled by the GEM data packet, according to a mode for assembling the third T-CONT data packet; and storing the assembled third T-CONT data packet, writing the third T-CONT data packet into a bus according to the assigned T-CONT time-slot position, and sending the third T-CONT data packet.

18. A data transmission method of a packet add/drop multiplexer, comprising:

dropping a received data frame of an input transporting side, sending a first Transmission Container (T-CONT) data packet in the received data frame of the input transporting side to a branch unit, wherein a destination Network Element (NE) identifier (ID) of the first T-CONT data packet is a local NE ID; buffering a second T-CONT data packet in the received data frame of the input transporting side, and performing a rate adjustment on the buffered second T-CONT data packet, wherein a destination NE ID of the second T-CONT data packet is a non-local NE ID;

decapsulating the first T-CONT data packet received by the branch unit, extracting Gigabit-Capable Passive Optical Network (GPON) Encapsulation Method (GEM) data packet in the first T-CONT data packet, assembling the GEM data packet in a downstream data frame of the branch unit, and sending the downstream data frame to a terminal;

extracting a GEM data packet in an upstream data frame of the branch unit, encapsulating the GEM data packet in a third T-CONT data packet, and sending the third T-CONT data packet; and performing frame reassembly on the second T-CONT data packet after the rate adjustment and the third T-CONT data packet sent by the branch unit, generating a data frame of an output transporting side, and sending the data frame of the output transporting side, wherein a source NE ID of the third T-CONT data packet is a local NE ID, wherein the decapsulating the first T-CONT data packet received by the branch unit, extracting the GEM data packet in the first T-CONT data packet, assembling the GEM data packet in the downstream data frame of the branch unit, and sending the downstream data frame to the terminal comprises:

dropping the first T-CONT data packet corresponding to the ODN ID according to the ODN ID, and extracting the GEM data packet in the first T-CONT data packet;

scheduling the GEM data packet to a buffer area of the downstream data frame of a PON branch unit, according to a PORT-ID of a destination terminal in the GEM data packet; and assembling the GEM data packet buffered in the buffer area of the downstream data frame to a PON downstream data frame, and sending the PON downstream data frame to the corresponding destination terminal.

19. A data transmission method of a packet add/drop multiplexer, comprising:

dropping a received data frame of an input transporting side, sending a first Transmission Container (T-CONT) data packet in the received data frame of the input transporting side to a branch unit, wherein a destination Network Element (NE) identifier (ID) of the first T-CONT data packet is a local NE ID; buffering a second T-CONT data packet in the received data frame of the input transporting side and performing a rate adjustment on the buffered second T-CONT data packet, wherein a destination NE ID of the second T-CONT data packet is a non-local NE ID;

decapsulating the first T-CONT data packet received by the branch unit, extracting a Gigabit-Capable Passive Optical Network (GPON) Encapsulation Method (GEM) data packet in the first T-CONT data packet, assembling the GEM data packet in a downstream data frame of the branch unit, and sending the downstream data frame to a terminal;

extracting a GEM data packet in an upstream data frame of the branch unit, encapsulating the GEM data packet in a third T-CONT data packet, and sending the third T-CONT data packet; and performing frame reassembly on the second T-CONT data packet after the rate adjustment and the third T-CONT data packet sent by the branch unit, generating a data frame of an output transporting side, and sending the data frame of the output transporting side wherein a source NE ID of the third T-CONT data packet is a local NE ID, wherein the extracting the GEM data packet in the upstream data frame of the branch unit, encapsulating the GEM data packet in the third T-CONT data packet, and sending the third T-CONT data packet comprises:

receiving data sent by the terminal;

encapsulating the data sent by the terminal to the GEM data packet;

assigning a PORT-ID of the GEM data packet according to a Virtual Local Area Network (VLAN) or a port receiving the data;

adding an NE ID, or adding an ODN ID and an NE ID to an overhead area of the third T-CONT data packet assembled by the GEM data packet, according to a mode for assembling the third T-CONT data packet; and storing the assembled third T-CONT data packet, writing the third T-CONT data packet into a bus according to the assigned T-CONT time-slot position, and sending the third T-CONT data packet.

20. A data transmission method of a packet add/drop multiplexer, comprising:

dropping a received data frame of an input transporting side, sending a first Transmission Container (T-CONT) data packet in the received data frame of the input transporting side to a branch unit, wherein a destination Network Element (NE) identifier (ID) of the first T-CONT data packet is a local NE ID; buffering a second T-CONT data packet in the received data frame of the input transporting side, and performing a rate adjustment on the buffered second T-CONT data packet, wherein a destination NE ID of the second T-CONT data packet is a non-local NE ID;

decapsulating the first T-CONT data packet received by the branch unit, extracting a Gigabit-Capable Passive Optical Network (GPON) Encapsulation Method (GEM) data packet in the first T-CONT data packet, assembling the GEM data packet in a downstream data frame of the branch unit, and sending the downstream data frame to a terminal;

extracting a GEM data packet in an upstream data frame of the branch unit, encapsulating the GEM data packet in a third T-CONT data packet, and sending the third T-CONT data packet; and performing frame reassembly on the second T-CONT data packet after the rate adjustment and the third T-CONT data packet sent by the branch unit generating a data frame of an output transporting side, and sending the data frame of the output transporting side, wherein a source NE ID of the third T-CONT data packet is a local NE ID, further comprising:

collecting a transporting side dynamic bandwidth assignment (DBA) request of the branch unit of a local NE, and sending the transporting side DBA request to a processing NE for processing the transporting side DBA request, wherein the processing NE is a local NE or a non-local NE;

processing, by the processing NE, the received transporting side DBA request according to a DBA algorithm, and sending an acquired transporting side bandwidth (BW)-MAP to the branch unit corresponding to the local NE; and generating, by the local NE, a read/write timing according to indication of the transporting side BW-MAP, and controlling the buffered third T-CONT data packet to be read from a buffer and written into a bus according to the assigned T-CONT time-slot position.

21. The data transmission method of the packet add/drop multiplexer according to claim 20, wherein the collecting the transporting side DBA request of the branch unit of the local NE, and sending the transporting side DBA request to the processing NE for processing the transporting side DBA request comprises:

collecting the transporting side DBA request of the branch unit of the local NE, carrying the transporting side BDA request in the first T-CONT data packet, and reporting the transporting side BDA request to the processing NE for processing the transporting side DBA request.

* * * * *